(12) United States Patent
Auyeung et al.

(10) Patent No.: US 12,096,040 B2
(45) Date of Patent: Sep. 17, 2024

(54) DISABLING CODING TOOL FOR ACTIVE COLOR TRANSFORM

(71) Applicant: TENCENT AMERICA LLC, Palo Alto, CA (US)

(72) Inventors: Cheung Auyeung, Sunnyvale, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/323,668

(22) Filed: May 25, 2023

(65) Prior Publication Data
US 2023/0300378 A1     Sep. 21, 2023

Related U.S. Application Data

(63) Continuation of application No. 17/412,952, filed on Aug. 26, 2021, now Pat. No. 11,722,701, which is a
(Continued)

(51) Int. Cl.
*H04N 19/70* (2014.01)
*H04N 19/176* (2014.01)
*H04N 19/186* (2014.01)

(52) U.S. Cl.
CPC .......... *H04N 19/70* (2014.11); *H04N 19/176* (2014.11); *H04N 19/186* (2014.11)

(58) Field of Classification Search
None
See application file for complete search history.

(56) References Cited

U.S. PATENT DOCUMENTS

| 2014/0301463 A1 | 10/2014 | Rusanovskyy et al. |
| 2015/0373327 A1 | 12/2015 | Zhang et al. |

(Continued)

FOREIGN PATENT DOCUMENTS

| JP | 2014531169 A | 11/2014 |
| JP | 2017523677 A | 8/2017 |

(Continued)

OTHER PUBLICATIONS

Abe et al., "AHG9: On JCCR signaling," Joint Video Experts Team (JVET) of ITU-T SG 16 WP 3 and ISO/IEC JTC 1/SC 29/WG 11, Jan. 7-17, 2020, JVET-Q0147-v1, 17th Meeting: Brussels, BE, pp. 1-2.

(Continued)

*Primary Examiner* — Christopher Braniff
(74) *Attorney, Agent, or Firm* — ArentFox Schiff LLP

(57) ABSTRACT

In a method of video encoding, whether a sequence of pictures are monochrome or include three color components that are coded separately is determined. Responsive to the sequence of pictures being monochrome or including three color components that are coded separately, a value of a first syntax element is set to indicate that the sequence of pictures are monochrome or include three color components that are coded separately. The value of the first syntax element is encoded in a bitstream of a coded video. A value of a second syntax element is inferred to disable a coding tool that uses multiple color components of a picture as input or depends on a chroma component of the picture based on the first syntax element indicating that the sequence of pictures include three color components that are coded separately. The inferred value indicates active color transform (ACT) is disabled.

20 Claims, 13 Drawing Sheets

Related U.S. Application Data continuation of application No. 17/072,980, filed on Oct. 16, 2020, now Pat. No. 11,368,723.

(60) Provisional application No. 62/924,674, filed on Oct. 22, 2019.

(56) References Cited

U.S. PATENT DOCUMENTS

| | | | |
|---|---|---|---|
| 2017/0150183 A1 | 5/2017 | Zhang et al. |
| 2018/0160132 A1 | 6/2018 | Hendry et al. |
| 2020/0396467 A1 | 12/2020 | Lai et al. |

FOREIGN PATENT DOCUMENTS

| | | | |
|---|---|---|---|
| JP | 2017523684 A | 8/2017 |
| WO | 2019069950 A1 | 4/2019 |

OTHER PUBLICATIONS

Auyeung et al., "Modifications to VVC Draft 7 to support monochrome and independently coded color planes," Joint Video Experts Team (JVET) of ITU-T SG 16 WP 3 and ISO/IEC JTC 1/SC 29/WG 11, Jan. 7-17, 2020, JVET-Q0265, 17th Meeting: Brussels, BE, pp. 1-6.

Bross et al., "Versatile Video Coding (Draft 6)," Joint Video Experts Team (JVET) of ITU-T SG 16 WP 3 and ISO/IEC JTC 1/SC 29/WG 11, Jul. 3-12, 2019, JVET-O2001-vC, 15th Meeting: Gothenburg, SE, 435 pages.

Bross et al., "Versatile Video Coding (Draft 7)," Joint Video Experts Team (JVET) of ITU-T SG 16 WP 3 and ISO/IEC JTC 1/SC 29/WG 11, Oct. 1-11, 2019, JVET-P2001-vA, 16th Meeting: Geneva, CH, 486 pages.

Chen et al., "Algorithm description for Versatile Video Coding and Test Model 6 (VTM 6)," Joint Video Experts Team (JVET) of ITU-T SG 16 WP 3 and ISO/IEC JTC 1/SC 29/WG 11, Jul. 3-12, 2019, JVET-O2002-v2, 15th Meeting: Gothenburg, SE, 87 pages.

Coding of moving pictures and audio Convenorship: UNI (Italy), "Working Draft 2 of Compression of neural networks for multimedia content description and analysis," International Organization for Standardization ISO/IEC JTC1/SC29/ WG11 Coding of Moving Pictures and Audio, Oct. 2019, N18784, Geneva, CH, 26 pages.

Coding of moving pictures and audio Convenorship: UNI (Italy), "Description of Core Experiments on Compression of neural networks for multimedia content description and analysis," International Organization for Standardization ISO/IEC JTC1/SC29/WG11 Coding of Moving Pictures and Audio, Oct. 2019, N18782, Geneva, CH, 14 pages.

Coding of moving pictures and audio Convenorship: UNI (Italy), "Test model 2 of Compression of neural networks for multimedia content description and analysis," International Organization for Standardization ISO/IEC JTC1/SC29/ WG11 Coding of Moving Pictures and Audio, Oct. 2019, N18785, Geneva, CH, 10 pages.

Extended European Search Report in EP20878822.4, mailed Mar. 24, 2023, 12 pages.

Helmrich, C., "#371 closed defect (fixed): Avoid reading unused slice-level elements for joint coding of chroma residuals (JCCR) when sps_joint_cbcr_enabled_flag = 0," JVET VVC, Retrieved Mar. 13, 2023, Retrieved from Internet: <URL:https://jvet.hhi.fraunhofer.de/trac/vvc/ticket/371>, 3 pages.

International Search Report and Written Opinion in PCT/US2020/056275, mailed Jan. 21, 2021, 15 pages.

International Telecommunications Union, "High efficiency video coding," Recommendation ITU-T H.265, Dec. 2016, 664 pages.

Liao et al., "AHG9: Syntax cleanup of chroma coding tools in 444 color format," Joint Video Experts Team (JVET) of ITU-T SG 16 WP 3 and ISO/IEC JTC 1/SC 29/WG 11, Jan. 7-17, 2020, JVET-Q0329-v1, 17th Meeting: Brussels, BE, pp. 1-3.

Nalci et al., "AHG18: Bdpcm for Lossless," Joint Video Experts Team (JVET) of ITU-T SG 16 WP 3 and ISO/IEC JTC 1/SC 29/WG 11, Oct. 1-11, 2019, JVET-P0082-v9, 16th Meeting: Geneva, CH, pp. 1-12.

Nalci et al., "BDPCM for Lossless," Qualcomm Inc., Jun. 10, 2019, JVET-P0082, 12 pages.

Office Action in IN202137048034, mailed Jun. 6, 2022, 6 pages.

Office Action in JP2021556292, mailed Nov. 21, 2022, 15 pages.

Seregin et al., "AHG9: On separate colour plane coding," Joint Video Experts Team (JVET) of ITU-T SG 16 WP 3 and ISO/IEC JTC 1/SC 29/WG 11, Jan. 7-17, 2020, JVET-Q0155, 17th Meeting: Brussels, BE, pp. 1-4.

DISABLING CODING TOOL FOR ACTIVE COLOR TRANSFORM

INCORPORATION BY REFERENCE

This present application is a continuation of U.S. application Ser. No. 17/412,952, "SIGNALING OF CODING TOOLS FOR ENCODING A VIDEO COMPONENT AS MONOCHROME VIDEO" filed on Aug. 26, 2021, which is a continuation of U.S. application Ser. No. 17/072,980, "SIGNALING OF CODING TOOLS FOR ENCODING A VIDEO COMPONENT AS MONOCHROME VIDEO" filed on Oct. 16, 2020, now U.S. Pat. No. 11,368,723, which claims the benefit of priority to U.S. Provisional Application No. 62/924,674, "SIGNALING OF VIDEO CODING TOOLS FOR THE ENCODING OF A VIDEO COMPONENT AS MONOCHROME VIDEO" filed on Oct. 22, 2019, which are incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction besides DC prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

The intra prediction modes used in HEVC are illustrated in FIG. 1B. In HEVC, there are total 35 intra prediction modes, among which mode 10 is horizontal mode, mode 26 is vertical mode, and mode 2, mode 18 and mode 34 are diagonal modes. The intra prediction modes are signalled by three most probable modes (MPMs) and 32 remaining modes.

FIG. 1C illustrates the intra prediction modes used in VVC. In VVC, there are total 95 intra prediction modes as shown in FIG. 1C, where mode 18 is the horizontal mode, mode 50 is the vertical mode, and mode 2, mode 34 and mode 66 are diagonal modes. Modes −1~−14 and Modes 67~80 are called Wide-Angle Intra Prediction (WAIP) modes.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving MPMs, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate) of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1D, a current block (110) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using. The order of forming a candidate list may be A0→B0→B1→A1→B2.

SUMMARY

Aspects of the disclosure provide a method of video decoding performed in a video decoder. A syntax element can be received from a bitstream of a coded video that indicates whether a sequence of pictures are monochrome or include three color components that are coded separately. By inferring a value of a syntax element, a coding tool can be disabled when the syntax element indicates that the sequence of pictures are monochrome or include three color components that are coded separately. The coding tool uses multiple color components of a picture as input or depends on a chroma component of a picture.

In an embodiment, the disabled coding tool is one of a coding tool of joint coding of chroma residuals, active color transform (ACT), or block-based delta pulse code modulation (BDPCM) for chroma component.

In an embodiment, the value of the syntax element indicating whether joint coding of chroma residuals is enabled is inferred to be equal to zero. In an embodiment, the value of the syntax element indicating whether ACT is enabled can be inferred to be equal to zero. In an embodiment, the value of the syntax element indicating whether BDPCM for chroma component is enabled can be inferred to be equal to zero.

In an embodiment, a value of a variable is determined to be zero when the syntax element indicates that the sequence of pictures are monochrome or include three color components that are coded separately. The variable indicates a chroma array type of the sequence of pictures. In response to determining the value of the variable to be zero, the value of one of the following syntax elements can inferred to be equal to zero: a syntax element indicating whether joint coding of chroma residuals is enabled, a syntax element indicating whether ACT is enabled, or a syntax element indicating whether BDPCM for chroma component is enabled.

In some embodiments, in response to determining the sequence of pictures are not monochrome and include three color components that are not coded separately, a syntax element indicating whether joint coding of chroma residuals is enabled can be received; a syntax element indicating whether ACT is enabled can be received; or a syntax element indicating whether BDPCM for chroma component is enabled can be received.

In an embodiment, in response to determining the sequence of pictures are not monochrome and include three color components that are not coded separately, a value of a variable indicating a chroma array type of the sequence of pictures can be determined. One of the following syntax elements can be received when the value of the variable is determined to be non-zero: a syntax element indicating whether joint coding of chroma residuals is enabled, a syntax element indicating whether ACT is enabled, or a syntax element indicating whether BDPCM for chroma component is enabled.

In an embodiment, a value of a variable indicating a chroma array type of the sequence of pictures can be determined when it is determined that the sequence of pictures are not monochrome and include three color components that are not coded separately. A syntax element indicating whether BDPCM for chroma component is enabled can be received when the value of the variable is determined to be non-zero, and when a lossless mode is enabled for the sequence of pictures.

Aspects of the disclosure provide an apparatus of video decoding comprising circuitry. The circuitry can be configured to receive a syntax element from a bitstream of a coded video. The syntax element indicates whether a sequence of pictures are monochrome or include three color components that are coded separately. The circuitry can be further configured to infer a value of a syntax element to disable a coding tool that uses multiple color components of a picture as input or depends on a chroma component of a picture when the syntax element indicates that the sequence of pictures are monochrome or include three color components that are coded separately.

Aspects of the disclosure provide a non-transitory computer-readable medium storing instructions that, when executed by a processor, cause the processor to perform the method of video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Video Encoder and Decoder Systems

Figure 1A:
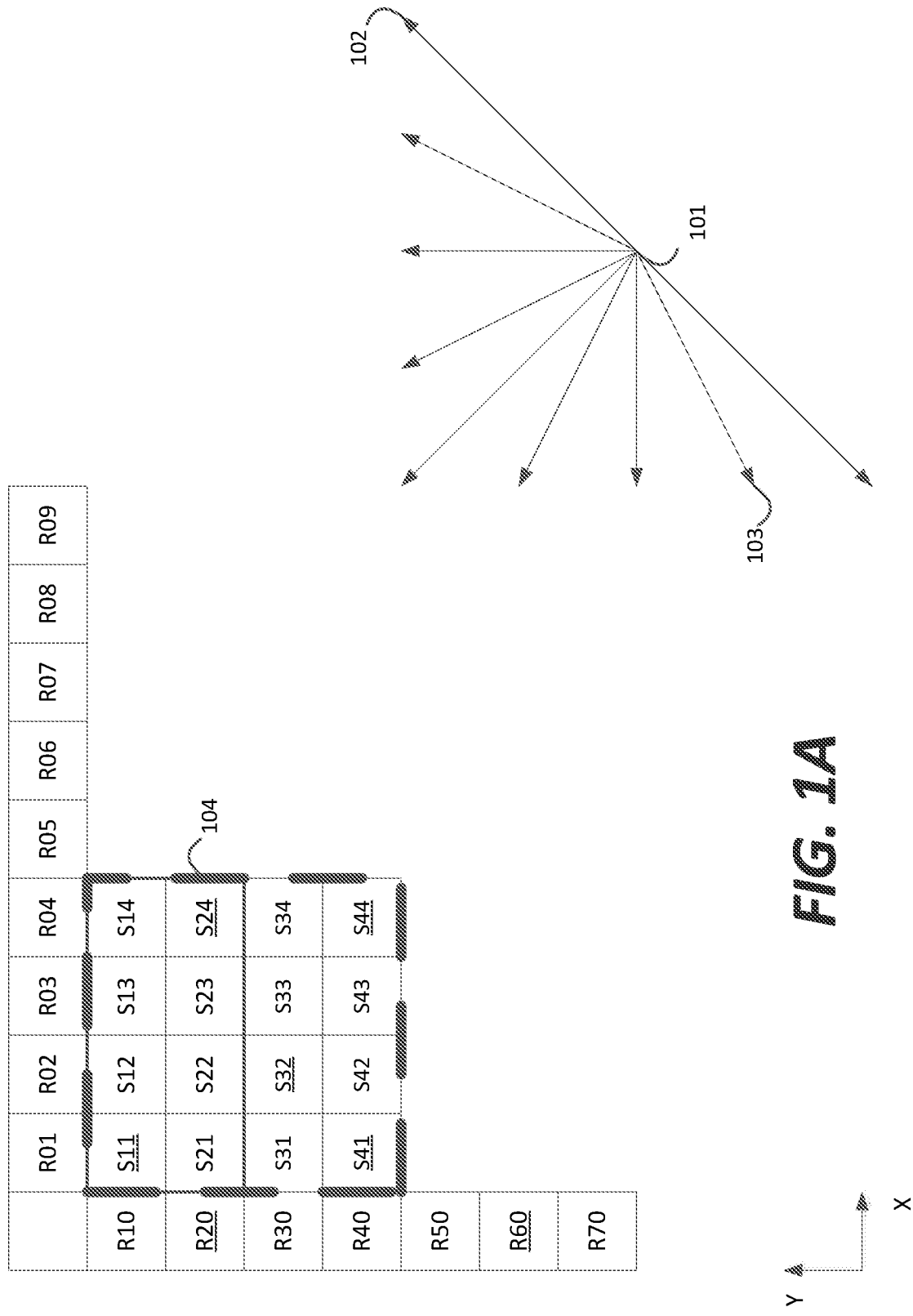
FIG. 1A is a schematic illustration of an exemplary subset of intra prediction modes.
Figure 1B:
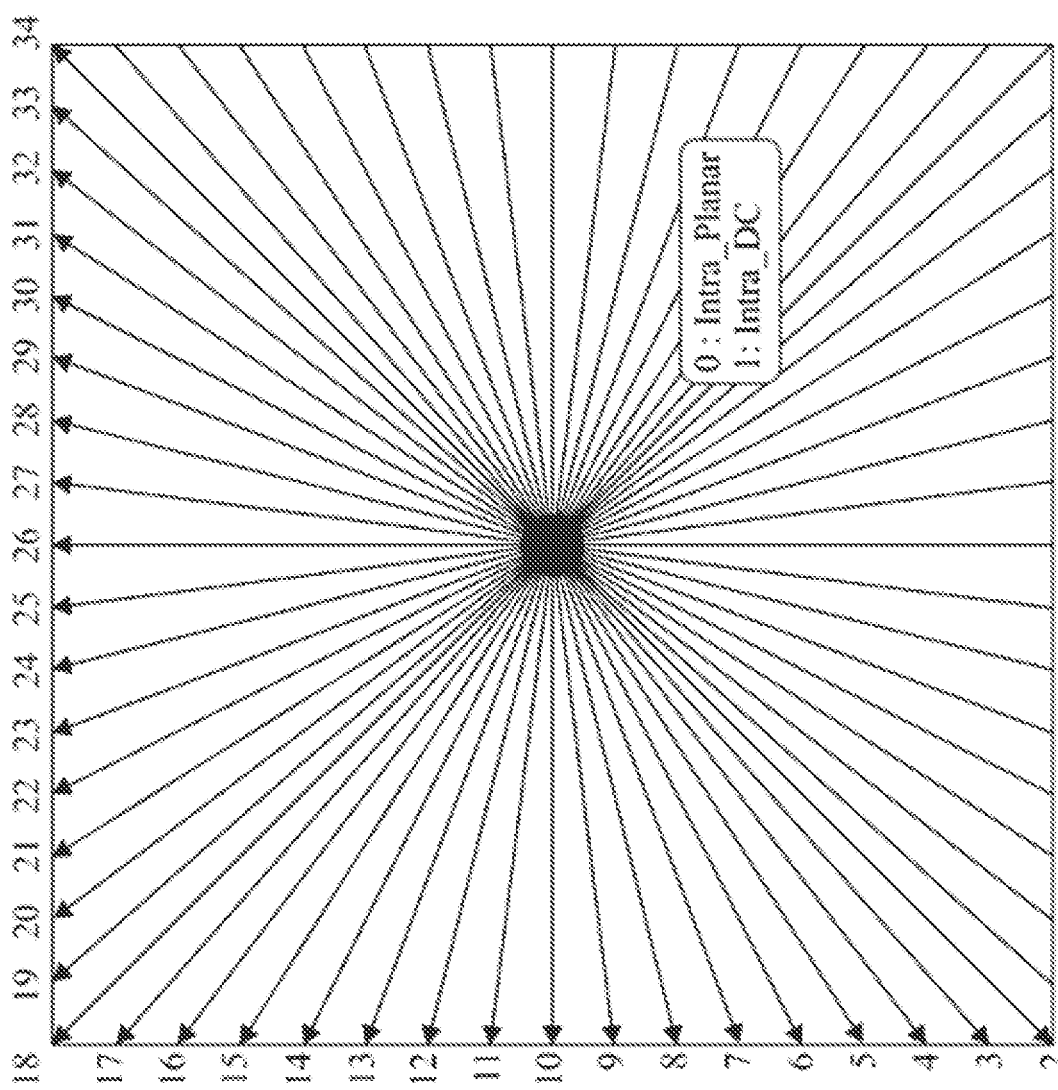
FIG. 1B is an illustration of exemplary intra prediction directions.
Figure 1C:
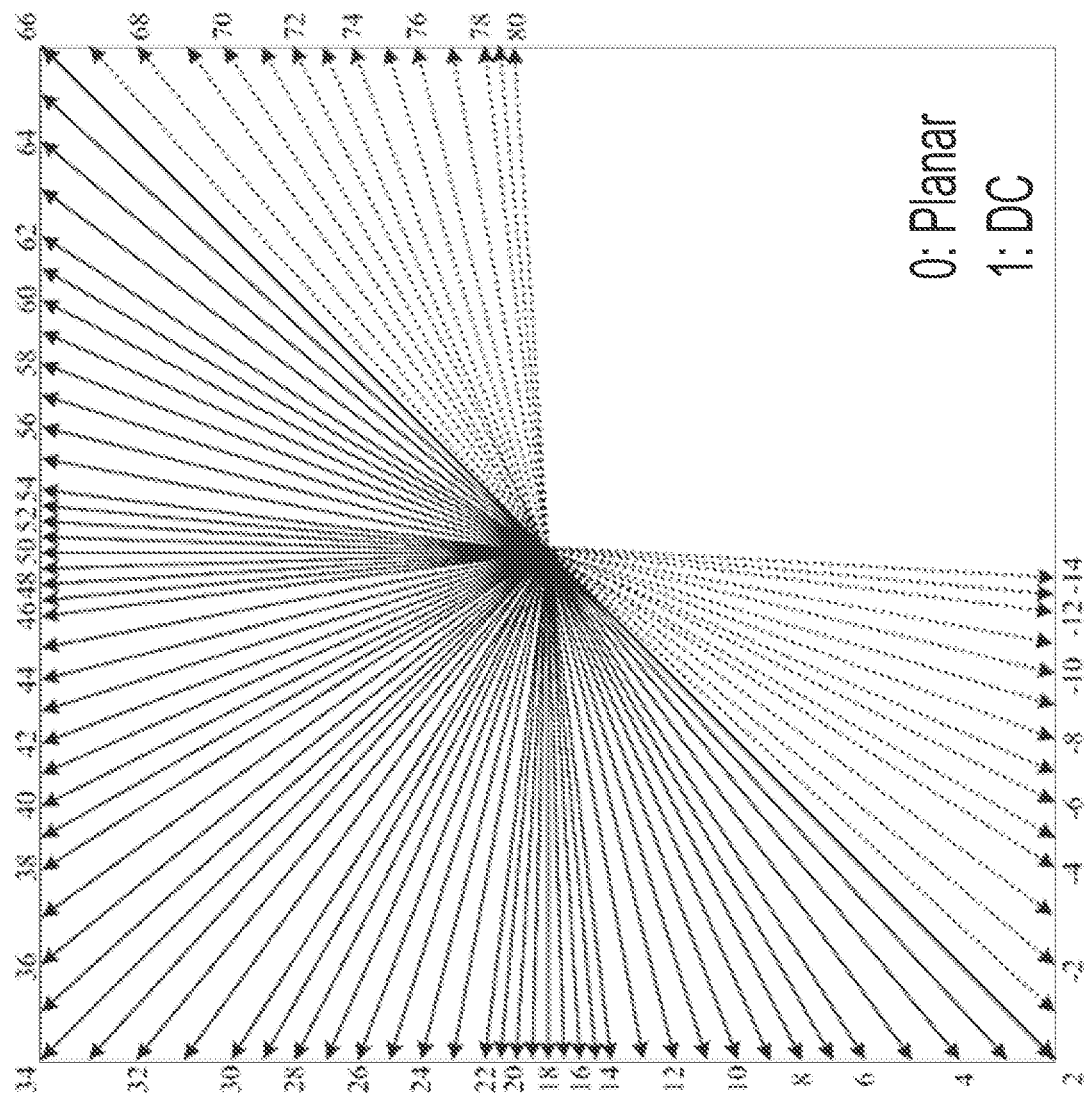
FIG. 1C is an illustration of exemplary intra prediction directions.
Figure 1D:
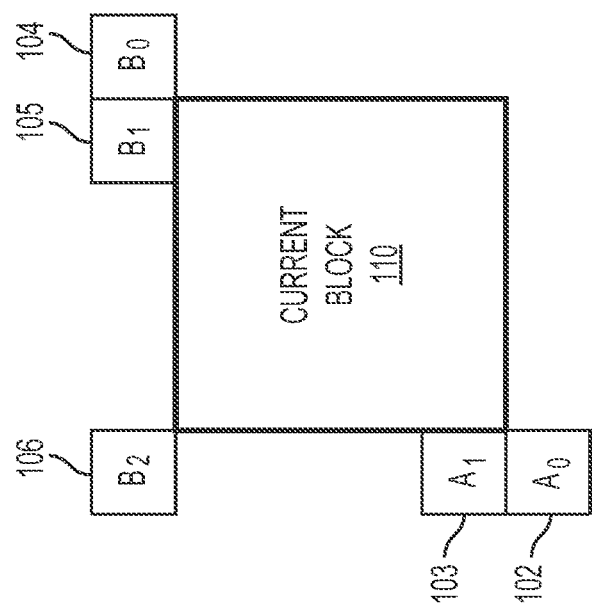
FIG. 1D is a schematic illustration of a current block and its surrounding spatial merge candidates in one example.
Figure 2:
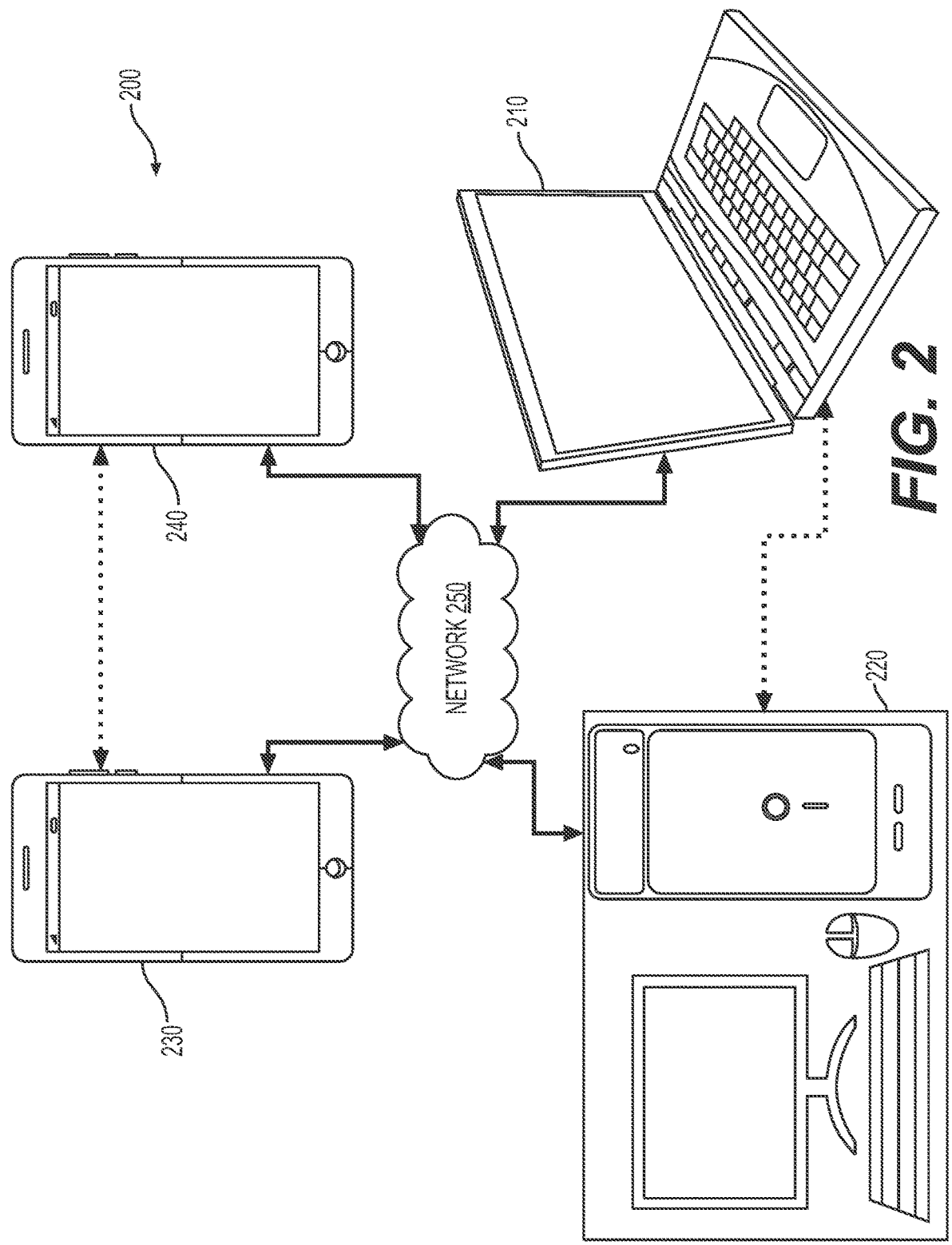
FIG. 2 is a schematic illustration of a simplified block diagram of a communication system in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210)

may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
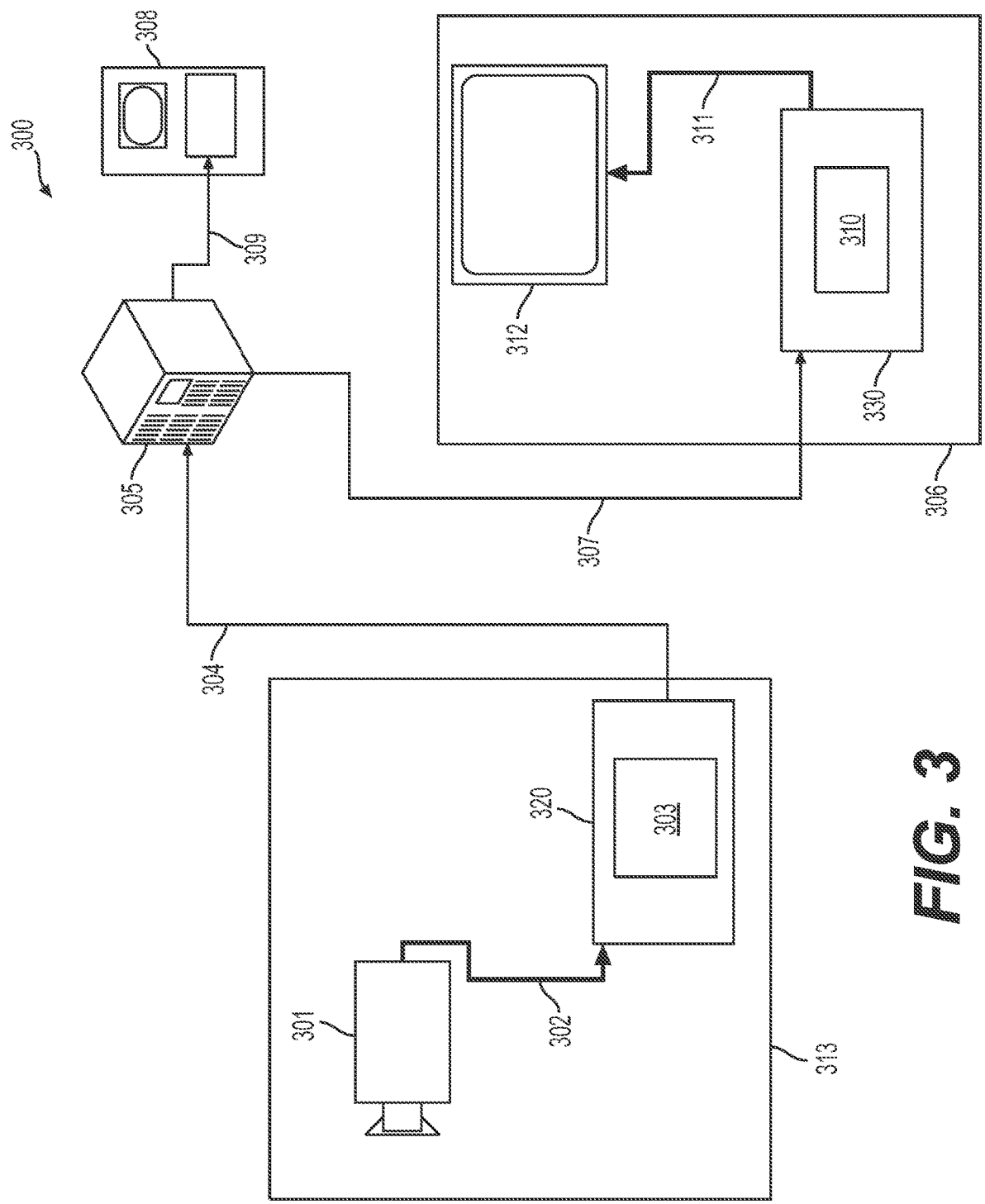
FIG. 3 is a schematic illustration of a simplified block diagram of a communication system in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
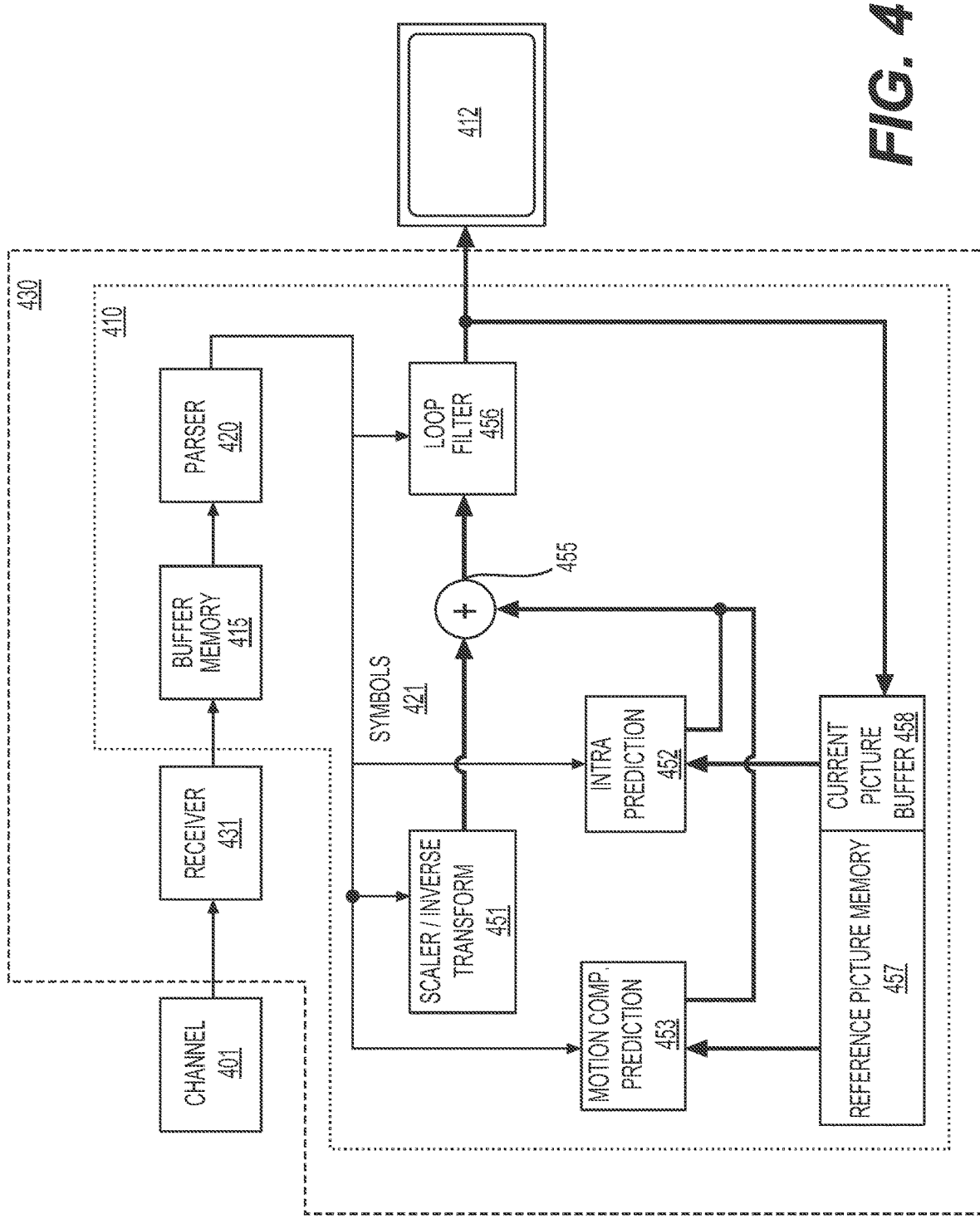
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks including sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
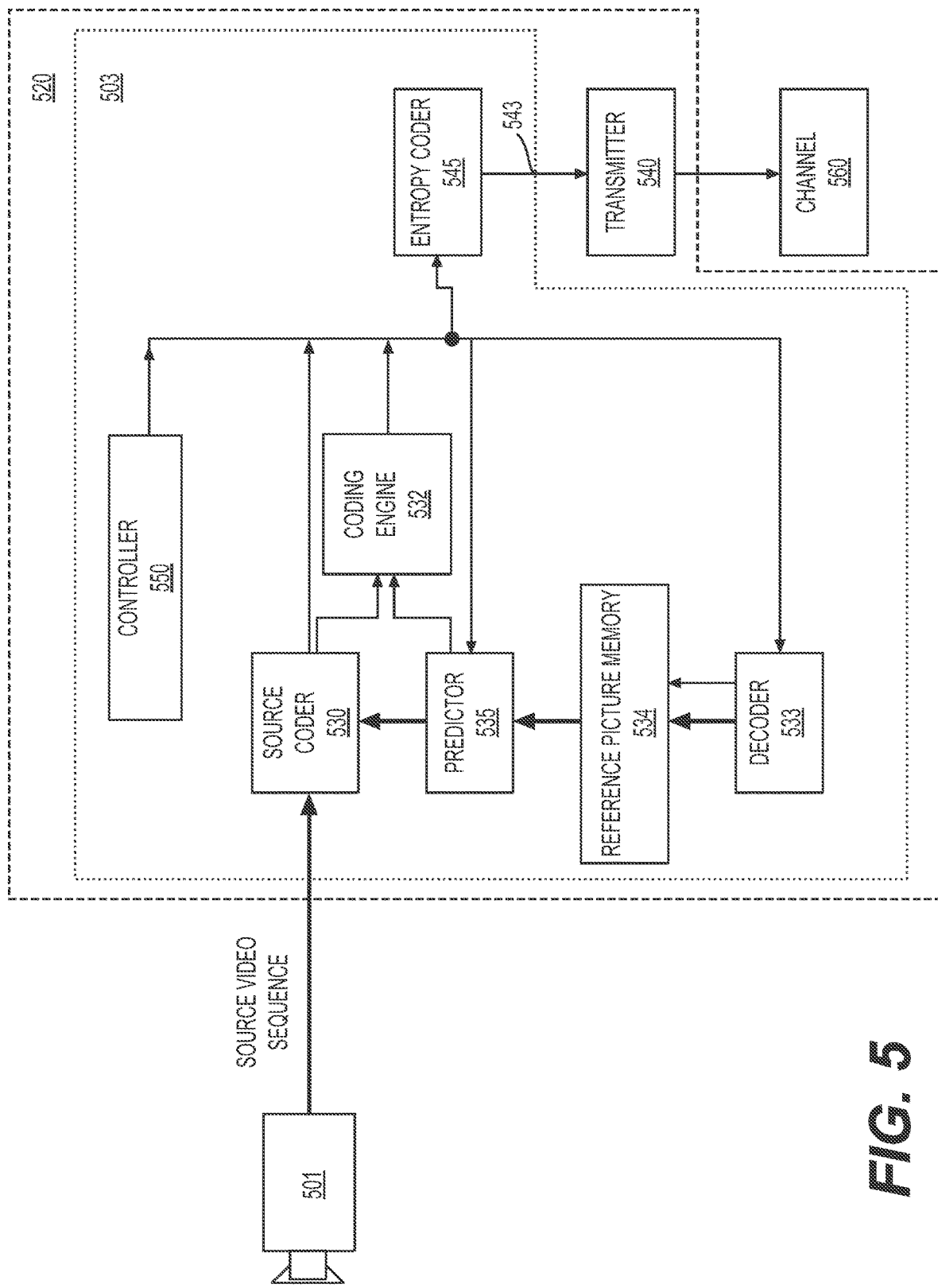
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
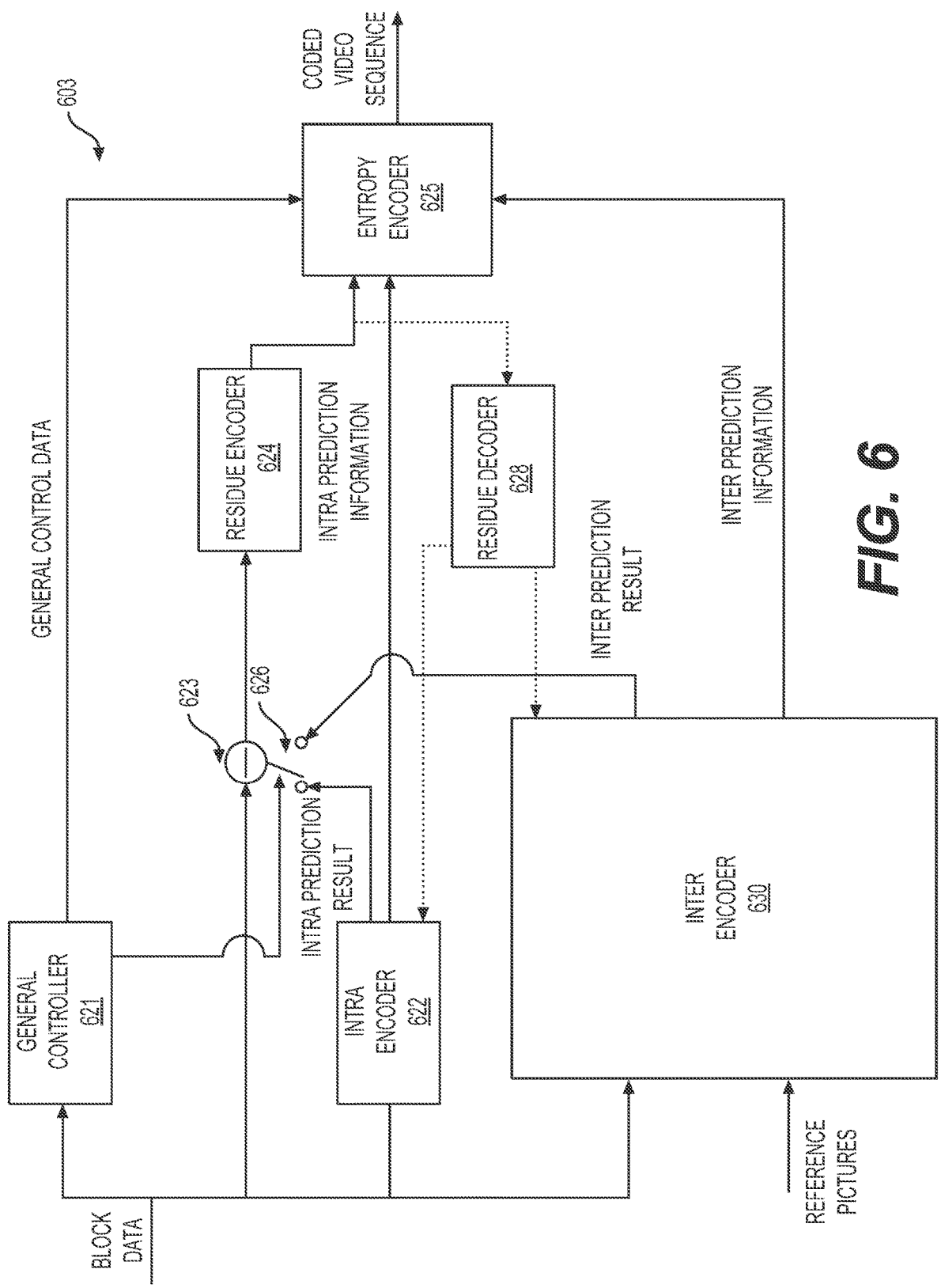
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
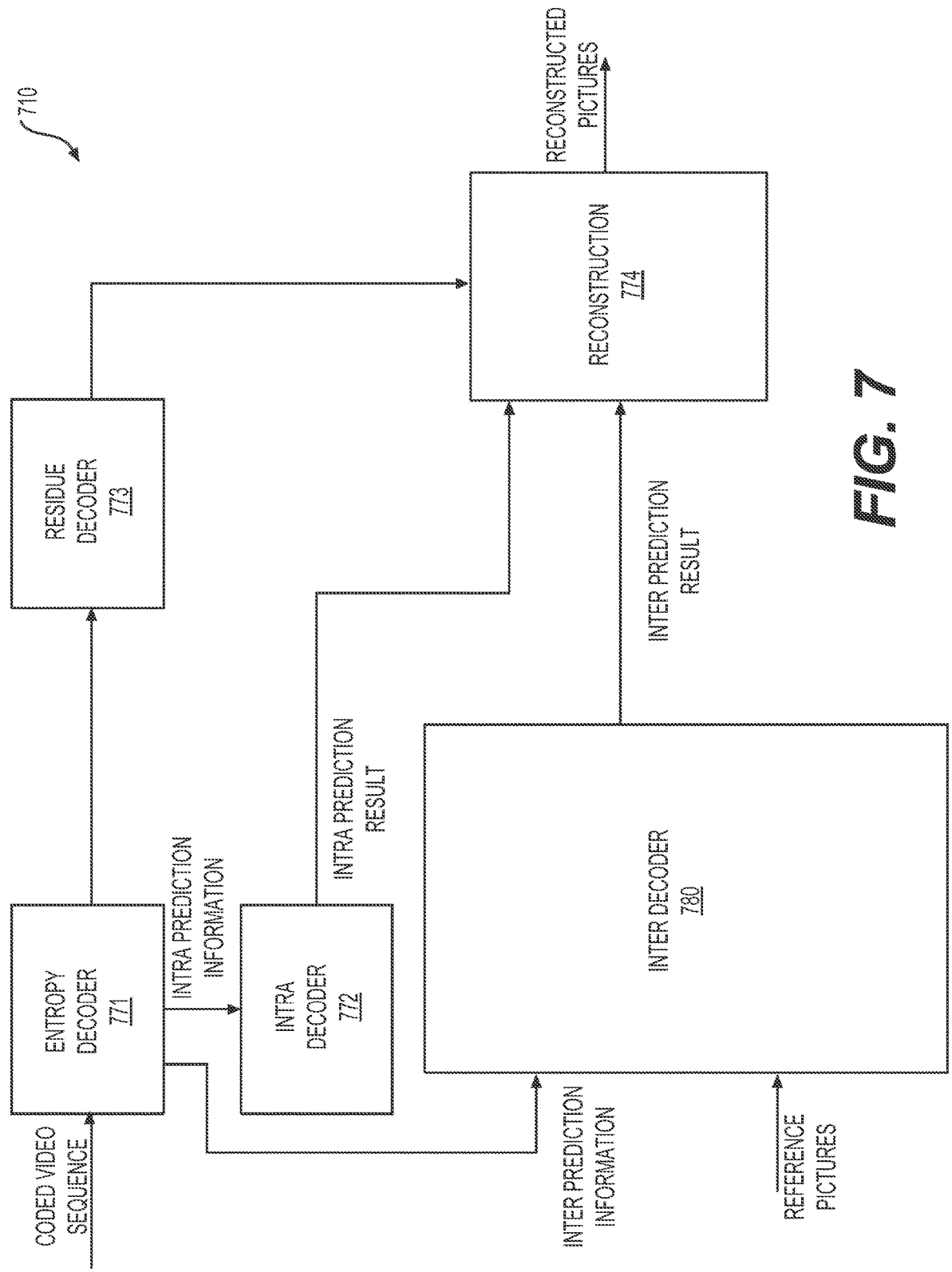
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

II. Separately Coding Video Color Components

Video coding technologies typically assume that a to-be-encoded video sequence has multiple color planes (e.g., one luma component and two chroma components). By employing certain coding tools, the color planes can be encoded jointly. For example, luma and chroma components of a same picture may share a same partitioning tree. Coded luma and chroma components can be organized into a same CU. Coding of chroma components may reference pixel values or residual values of a luma component for prediction (e.g., cross component linear model (CCLM)). A processing step may use three luma and chroma components as input (e.g., active color transform (ACT)). Or, two chroma components can be coded jointly (e.g., joint coding of chroma residuals (JCCR)).

However, in some applications, either a video is monochrome, or multiple color planes of a video are required to be encoded independently. For example, three color components of a video having a 4:4:4 chroma format may be required to be coded separately and independently. For example, each color component of the video is treated as a monochrome video. There is no dependency between those color components while the video being coded. Coding tools depending on multiple components (e.g., ACT and JCCR) or operating on chroma components (e.g., block-based delta (or differential) pulse code modulation (BDPCM)) are not employed. Coding of the video is based on monochrome coding tools operating on luma component.

To support coding of videos with different chroma formats and videos including one or more monochrome components, in some embodiments, two syntax elements are defined as shown in Table 1.

TABLE 1

| chroma_format_idc | separate_colour_plane_flag | Chroma format |
| --- | --- | --- |
| 0 | 0 | Monochrome |
| 1 | 0 | 4:2:0 |
| 2 | 0 | 4:2:2 |
| 3 | 0 | 4:4:4 |
| 3 | 1 | 4:4:4 |

The syntax element, chroma_format_idc, provides an index to multiple chroma formats. The defined chroma formats correspond to different chroma component sampling structures. Specifically, in monochrome sampling, there is only one sample array, which is nominally considered a luma array. In 4:2:0 sampling, each of the two chroma arrays can have half the height and half the width of the luma array. In 4:2:2 sampling, each of the two chroma arrays can have the same height and half the width of the luma array. For convenience of notation and terminology in this disclosure, the variables and terms associated with these arrays are referred to as luma and chroma. The two chroma arrays are referred to as Cb and Cr regardless of the actual color representation method in use. The actual color representation method in use can be indicated in syntax transmitted in a bitstream.

The syntax element, separate_colour_plane_flag, indicates whether color components of a video sequence are required to be coded separately. For example, separate_colour_plane_flag equal to 1 specifies that the three color components of the 4:4:4 chroma format can be coded separately. separate_colour_plane_flag equal to 0 specifies that the color components are not coded separately. When separate_colour_plane_flag is not present, it is inferred to be equal to 0.

When separate_colour_plane_flag is equal to 1, the coded picture consists of three separate components, each of which consists of coded samples of one color plane (e.g., Y, Cb, or Cr) and uses monochrome coding syntax. In this case, each color plane is associated with a specific colour_plane_id value. There is no dependency in decoding processes between the color planes having different colour_plane_id values. For example, the decoding process of a monochrome picture with one value of colour_plane_id does not use any data from monochrome pictures having different values of colour_plane_id for inter or intra prediction.

In 4:4:4 sampling, each of the two chroma arrays has the same height and width as the luma array, and depending on the value of separate_colour_plane_flag, the following can apply. If separate_colour_plane_flag is equal to 0, the three color planes are not separately processed as monochrome sampled pictures. Otherwise (separate_colour_plane_flag is equal to 1), the three color planes are separately processed as monochrome sampled pictures.

In an example, the syntax elements, chroma_format_idc and separate_colour_plane_flag, are signaled in a sequence parameter set (SPS) as shown in Table 2. At row 11 of Table 2, chroma_format_idc is signaled. At row 12, whether chroma_forma_idc indicates the 4:4:4 chroma format sampling structure is verified. At row 13, when the chroma_format_idc has a value of 3, separate_colour_plane_flag is signaled to indicate whether components of a video sequence referencing the SPS of Table 2 are coded separately.

When a video is a monochrome video or is required to encode each color component of the video as if each component is monochrome, joint color plane coding tools or chroma component based coding tools are not applicable and can be disabled. However, as shown in Table 2, several syntax elements controlling those inapplicable coding tools are signaled independently from whether separate encoding of color components is enabled (or required). As a result, some coding tools inapplicable to monochrome videos can still be enabled when separate encoding of different color planes as monochrome videos is employed for a current video, causing undesirable conflicts.

Specifically, at row 86 of Table 2, a syntax element, sps_joint_cbcr_enabled_flag, is signaled without dependency on the sperate_colour_plane_flag signaled at row 13. The sps_joint_cbcr_enabled_flag can indicate whether the joint coding of chroma residuals (JCCR) tool is enabled for coding a video. As two chroma components of a CU are jointly coded, the JCCR coding tool is not a monochrome coding tool. The sps_joint_cbcr_enabled_flag equal to 0 specifies that the joint coding of chroma residuals is disabled. The sps_joint_cbcr_enabled_flag equal to 1 specifies that the joint coding of chroma residuals is enabled.

At rows 104-105, when BDPCM is enabled and the chroma format is 4:4:4, a syntax element, sps_bdpcm_chroma_enabled_flag, is signaled without dependency on the sperate_colour_plane_flag signaled at row 13. The sperate_colour_plane_flag can indicate whether the tool of BDPCM for chroma is enabled for coding a video. The BDPCM for chroma is a coding tool applied to chroma component, and thus can be disabled if the video is monochrome, or is required to encode each color component of the video as if each component is monochrome.

Regarding the semantics, sps_bdpcm_chroma_enabled_flag equal to 1 specifies that intra_bdpcm_chroma_flag may be present in coding unit syntax for intra coding units. sps_bdpcm_chroma_enabled_flag equal to 0 specifies that intra_bdpcm_chroma_flag is not present in the coding unit syntax for intra coding units. When not present, the value of sps_bdpcm_chroma_enabled_flag is inferred to be equal to 0. Intra_bdpcm_chroma_flag equal to 1 specifies that BDPCM is applied to current chroma coding blocks, i.e. the transform is skipped, the intra chroma prediction mode is specified by intra_bdpcm_chroma_dir_flag. intra_bdpcm_chroma_flag equal to 0 specifies that BDPCM is not applied to the current chroma coding blocks. When intra_bdpcm_chroma_flag is not present it is inferred to be equal to 0.

At rows 142 and 144 of Table 2, when the chroma format is 4:4:4, a syntax element, sps_act_enabled_flag, is signaled without dependency on the sperate_colour_plane_flag signaled at row 13. The sps_act_enabled_flag can indicate whether the ACT tool is enabled for coding a video. For example, a color format (e.g., RGB) in an original color space can have high correlations among three color components. By performing a color space conversion, the color format can be converted from the original color space to a target color space to reduce redundancy among the three color components. For example, in HEVC or VCC, the ACT can be performed in spatial residual domain to convert residual blocks from RGB color space to YCgCo color space. The residual blocks of three components are used as input. Thus, ACT is not applicable to a monochrome video or a video having color components processed separately.

Regarding the semantics, sps_act_enabled_flag specifies that whether adaptive color transform is enabled. If sps_act_enabled_flag is equal to 1, adaptive color transform may be used and the flag cu_act_enabled_flag may be present in the coding unit syntax. If sps_act_enabled_flag is equal to 0, adaptive color transform is not used and cu_act_enabled_flag is not present in the coding unit syntax. When sps_act_enabled_flag is not present, it is inferred to be equal to 0.

TABLE 2

|  |  | Descriptor |
|---|---|---|
| 1 | seq_parameter_set_rbsp( ) { |  |
| 2 |   sps_decoding_parameter_set_id | u(4) |
| 3 |   sps_video_parameter_set_id | u(4) |
| 4 |   sps_max_sub_layers_minus1 | u(3) |
| 5 |   sps_reserved_zero_4bits | u(4) |
| 6 |   sps_ptl_dpb_hrd_params_present_flag | u(1) |
| 7 |   if( sps_ptl_dpb_hrd_params_present_flag ) |  |
| 8 |     profile_tier_level( 1, sps_max_sub_layers_minus1 ) |  |
| 9 |   gdr_enabled_flag | u(1) |
| 10 |   sps_seq_parameter_set_id | u(4) |
| 11 ** |   chroma_format_idc | u(2) |
| 12 ** |   if( chroma_format_idc = = 3 ) |  |
| 13 ** |     separate_colour_plane_flag | u(1) |
| 14 |   ref_pic_resampling_enabled_flag | u(1) |
| 15 |   sps_seq_parameter_set_id | ue(v) |
| 16 |   chroma_format_idc | ue(v) |
| 17 |   pic_width_max_in_luma_samples | ue(v) |
| 18 |   pic_height_max_in_luma_samples | ue(v) |
| 19 |   sps_log2_ctu_size_minus5 | u(2) |
| 20 |   subpics_present_flag | u(1) |
| 21 |     sps_num_subpics_minus1 | u(8) |
| 22 |     for( i = 0; i <= sps_num_subpics_minus1; i++ ) { |  |
| 23 |       subpic_ctu_top_left_x[ i ] | u(v) |
| 24 |       subpic_ctu_top_left_y[ i ] | u(v) |
| 25 |       subpic_width_minus1[ i ] | u(v) |
| 26 |       subpic_height_minus1[ i ] | u(v) |
| 27 |       subpic_treated_as_pic_flag[ i ] | u(1) |

TABLE 2-continued

| | | Descriptor |
|---|---|---|
| 28 |         loop_filter_across_subpic_enabled_flag[ i ] | u(1) |
| 29 |       } | |
| 30 |     } | |
| 31 |   sps_subpic_id_present_flag | u(1) |
| 32 |   if( sps_subpics_id_present_flag ) { | |
| 33 |     sps_subpic_id_signalling_present_flag | u(1) |
| 34 |     if( sps_subpics_id_signalling_present_flag ) { | |
| 35 |       sps_subpic_id_len_minus1 | ue(v) |
| 36 |       for( i = 0; i <= sps_num_subpics_minus1; i++ ) | |
| 37 |         sps_subpic_id[ i ] | u(v) |
| 38 |     } | |
| 39 |   } | |
| 40 |   bit_depth_minus8 | ue(v) |
| 41 |   min_qp_prime_ts_minus4 | ue(v) |
| 42 |   sps_weighted_pred_flag | u(1) |
| 43 |   sps_weighted_bipred_flag | u(1) |
| 44 |   log2_max_pic_order_cnt_lsb_minus4 | u(4) |
| 45 |   sps_poc_msb_flag | u(1) |
| 46 |   if( sps_poc_msb_flag ) | |
| 47 |     poc_msb_len_minus1 | ue(v) |
| 48 |   if( sps_max_sub_layers_minus1 > 0 ) | |
| 49 |     sps_sub_layer_dpb_params_flag | u(1) |
| 50 |   if( sps_ptl_dpb_hrd_params_present_flag ) | |
| 51 |     dpb_parameters( 0, sps_max_sub_layers_minus1, sps_sub_layer_dpb_params_flag ) | |
| 52 |   long_term_ref_pics_flag | u(1) |
| 53 |   inter_layer_ref_pics_present_flag | u(1) |
| 54 |   sps_idr_rpl_present_flag | u(1) |
| 55 |   rpl1_same_as_rpl0_flag | u(1) |
| 56 |   for( i = 0; i < !rpl1_same_as_rpl0_flag ? 2 : 1; i++ ) { | |
| 57 |     num_ref_pic_lists_in_sps[ i ] | ue(v) |
| 58 |     for( j = 0; j < num_ref_pic_lists_in_sps[ i ]; j++) | |
| 59 |       ref_pic_list_struct( i, j ) | |
| 60 |   } | |
| 61 |   if( Chroma ArrayType != 0 ) | |
| 62 |     qtbtt_dual_tree_intra_flag | u(1) |
| 63 |   log2_min_luma_coding_block_size_minus2 | ue(v) |
| 64 |   partition_constraints_override_enabled_flag | u(1) |
| 65 |   sps_log2_diff_min_qt_min_cb_intra_slice_luma | ue(v) |
| 66 |   sps_log2_diff_min_qt_min_cb_inter_slice | ue(v) |
| 67 |   sps_max_mtt_hierarchy_depth_inter_slice | ue(v) |
| 68 |   sps_max_mtt_hierarchy_depth_intra_slice_luma | ue(v) |
| 69 |   if( sps_max_mtt_hierarchy_depth_intra_slice_luma != 0 ) { | |
| 70 |     sps_log2_diff_max_bt_min_qt_intra_slice_luma | ue(v) |
| 71 |     sps_log2_diff_max_tt_min_qt_intra_slice_luma | ue(v) |
| 72 |   } | |
| 73 |   if( sps_max_mtt_hierarchy_depth_inter_slice != 0 ) { | |
| 74 |     sps_log2_diff_max_bt_min_qt_inter_slice | ue(v) |
| 75 |     sps_log2_diff_max_tt_min_qt_inter_slice | ue(v) |
| 76 |   } | |
| 77 |   if( qtbtt_dual_tree_intra_flag ) { | |
| 78 |     sps_log2_diff_min_qt_min_cb_intra_slice_chroma | ue(v) |
| 79 |     sps_max_mtt_hierarchy_depth_intra_slice_chroma | ue(v) |
| 80 |     if( sps_max_mtt_hierarchy_depth_intra_slice_chroma != 0 ) { | |
| 81 |       sps_log2_diff_max_bt_min_qt_intra_slice_chroma | ue(v) |
| 82 |       sps_log2_diff_max_tt_min_qt_intra_slice_chroma | ue(v) |
| 83 |     } | |
| 84 |   } | |
| 85 |   sps_max_luma_transform_size_64_flag | u(1) |
| 86 ** |   sps_joint_cbcr_enabled_flag | u(1) |
| 87 |   if( ChromaArrayType != 0 ) { | |
| 88 |     same_qp_table_for_chroma | u(1) |
| 89 |     numQpTables = same_qp_table_for_chroma ? 1 : ( sps_joint_cbcr_enabled_flag ? 3 : 2 ) | |
| 90 |     for( i = 0; i < numQpTables; i++ ) { | |
| 91 |       qp_table_start_minus26[ i ] | se(v) |
| 92 |       num_points_in_qp_table_minus1[ i ] | ue(v) |
| 93 |       for( j = 0; j <= num_points_in_qp_table_minus1[ i ]; j++ ) { | |
| 94 |         delta_qp_in_val_minus1[ i ][ j ] | ue(v) |
| 95 |         delta_qp_diff_val[ i ][ j ] | ue(v) |
| 96 |       } | |
| 97 |     } | |
| 98 |   } | |
| 99 |   sps_sao_enabled_flag | u(1) |
| 100 |   sps_alf_enabled_flag | u(1) |
| 101 |   sps_transform_skip_enabled_flag | u(1) |
| 102 |   if( sps_transform_skip_enabled_flag ) | |
| 103 |     sps_bdpcm_enabled_flag | u(1) |

TABLE 2-continued

| | | Descriptor |
|---|---|---|
| 104 ** | if( sps_bdpcm_enabled_flag && chroma_format_idc = = 3 ) | |
| 105 ** |    sps_bdpcm_chroma_enabled_flag | u(1) |
| 106 | sps_ref_wraparound_enabled_flag | u(1) |
| 107 | if( sps_ref_wraparound_enabled_flag ) | |
| 108 |    sps_ref_wraparound_offset_minus1 | ue(v) |
| 109 | sps_temporal_mvp_enabled_flag | u(1) |
| 110 | if( sps_temporal_mvp_enabled_flag ) | |
| 111 |    sps_sbtmvp_enabled_flag | u(1) |
| 112 | sps_amvr_enabled_flag | u(1) |
| 113 | sps_bdof_enabled_flag | u(1) |
| 114 | if( sps_bdof_enabled_flag ) | |
| 115 |    sps_bdof_pic_present_flag | u(1) |
| 116 | sps_smvd_enabled_flag | u(1) |
| 117 | sps_dmvr_enabled_flag | u(1) |
| 118 | if( sps_dmvr_enabled_flag) | |
| 119 |    sps_dmvr_pic_present_flag | u(1) |
| 120 | sps_mmvd_enabled_flag | u(1) |
| 121 | sps_isp_enabled_flag | u(1) |
| 122 | sps_mrl_enabled_flag | u(1) |
| 123 | sps_mip_enabled_flag | u(1) |
| 124 | if( ChromaArrayType != 0 ) | |
| 125 |    sps_cclm_enabled_flag | u(1) |
| 126 |    if( sps_cclm_enabled_flag && chroma_format_idc = = 1 ) [Ed. (JC): should sps_cclm_colocated_chroma_flag also be signalled for 422 case since it's used in the decoding process, to be confirmed] | |
| 127 |       sps_cclm_colocated_chroma_flag | u(1) |
| 128 | sps_mts_enabled_flag | u(1) |
| 129 | if( sps_mts_enabled_flag ) { | |
| 130 |    sps_explicit_mts_intra_enabled_flag | u(1) |
| 131 |    sps_explicit_mts_inter_enabled_flag | u(1) |
| 132 | } | |
| 133 | sps_sbt_enabled_flag | u(1) |
| 134 | sps_affine_enabled_flag | u(1) |
| 135 | if( sps_affine_enabled_flag ) { | |
| 136 |    sps_affine_type_flag | u(1) |
| 137 |    sps_affine_amvr_enabled_flag | u(1) |
| 138 |    sps_affine_prof_enabled_flag | u(1) |
| 139 |    if( sps_affine_prof_enabled_flag ) | |
| 140 |       sps_prof_pic_present_flag | u(1) |
| 141 | } | |
| 142 ** | if( chroma_format_idc = = 3 ) { | |
| 143 |    sps_palette_enabled_flag | u(1) |
| 144 ** |    sps_act_enabled_flag | u(1) |
| 145 | } | |
| 146 | sps_bcw_enabled_flag | u(1) |
| 147 | sps_ibc_enabled_flag | u(1) |
| 148 | sps_ciip_enabled_flag | u(1) |
| 149 | if( sps_mmvd_enabled_flag ) | |
| 150 |    sps_fpel_mmvd_enabled_flag | u(1) |
| 151 | sps_triangle_enabled_flag | u(1) |
| 152 | sps_lmcs_enabled_flag | u(1) |
| 153 | sps_lfnst_enabled_flag | u(1) |
| 154 | sps_ladf_enabled_flag | u(1) |
| 155 | if( sps_ladf_enabled_flag ) { | |
| 156 |    sps_num_ladf_intervals_minus2 | u(2) |
| 157 |    sps_ladf_lowest_interval_qp_offset | se(v) |
| 158 |    for( i = 0; i < sps_num_ladf_intervals_minus2 + 1; i++ ) { | |
| 159 |       sps_ladf_qp_offset[ i ] | se(v) |
| 160 |       sps_ladf_delta_threshold_minus1[ i ] | ue(v) |
| 161 |    } | |
| 162 | } | |
| 163 | sps_scaling_list_enabled_flag | u(1) |
| 164 | sps_loop_filter_across_virtual_boundaries_disabled_present_flag | u(1) |
| 165 | if( sps_loop_filter_across_virtual_boundaries_disabled_present_flag ) { | |
| 166 |    sps_num_ver_virtual_boundaries | u(2) |
| 167 |    for( i = 0; i < sps_num_ver_virtual_boundaries; i++ ) | |
| 168 |       sps_virtual_boundaries_pos_x[ i ] | u(13) |
| 169 |    sps_num_hor_virtual_boundaries | u(2) |
| 170 |    for( i = 0; i < sps_num_hor_virtual_boundaries; i++ ) | |
| 171 |       sps_virtual_boundaries_pos_y[ i ] | u(13) |
| 172 | } | |
| 173 | if( sps_ptl_dpb_hrd_params_present_flag ) { | |
| 174 |    sps_general_hrd_params_present_flag | u(1) |
| 175 |    if( sps_general_hrd_params_present_flag ) { | |
| 176 |       general_hrd_parameters( ) | |
| 177 |       if( sps_max_sub_layers_minus1 > 0 ) | |
| 178 |          sps_sub_layer_cpb_params_present_flag | u(1) |
| 179 |       firstSubLayer = sps_sub_layer_cpb_params_present_flag ? 0 : | |

TABLE 2-continued

| | | Descriptor |
|---|---|---|
| | sps_max_sub_layers_minus1 | |
| 180 | ols_hrd_parameters( firstSubLayer, sps_max_sub_layers_minus1 ) | |
| 181 | } | |
| 182 | } | |
| 183 | vui_parameters_present_flag | u(1) |
| 184 | if( vui_parameters_present_flag ) | |
| 185 | vui_parameters( ) | |
| 186 | sps_extension_flag | u(1) |
| 187 | if( sps_extension_flag ) | |
| 188 | while( more_rbsp_data( ) ) | |
| 189 | sps_extension_data_flag | u(1) |
| 190 | rbsp_trailing_bits( ) | |
| 191 | } | |

III. Disabling Coding Tools Inapplicable to Monochrome Video or Video with Separately Coded Components In some embodiments, to support the coding of monochrome video and the separate coding of three color components of, for example, a 4:4:4 chroma format video, a variable indicating a chroma array type is defined. The variable is denoted by ChromaArrayType. The variable ChromaArrayType can be used to disable the coding tools that are not applicable when the video is monochrome and when the color components of the video are required to be encoded separately and independently. Depending on the value of separate_colour_plane_flag, the value of the variable ChromaArrayType can be assigned as follows:

If separate_colour_plane_flag is equal to 0, ChromaArrayType is set equal to chroma_format_idc (e.g., 0, 1, 2, or 3).

Otherwise (separate_colour_plane_flag is equal to 1), ChromaArrayType is set equal to 0.

When ChromaArrayType is 0, the coding tools enabled by sps_joint_cbcr_enabled_flag, sps_act_enabled_flag, sps_bdpcm_chroma_enabled_flag, or the like can be disabled.

Table 3 shows a modified version of the SPS syntax shown in Table 2. At rows 84-85 of Table 3, sps_joint_cbcr_enabled_flag is signaled when ChromaArrayType has a non-zero value. When ChromaArrayType equals zero, which indicates a current video referring the SPS of Table 2 is monochrome, or includes separately encoded components, sps_joint_cbcr_enabled_flag is not signaled, and can be inferred to be equal to zero. Accordingly, the joint coding of chroma residuals can be disabled. Compared with the Table 2 examples, semantics of sps_joint_cbcr_enabled_flag can be modified as follows: sps_joint_cbcr_enabled_flag equal to 0 specifies that the joint coding of chroma residuals is disabled. sps_joint_cbcr_enabled_flag equal to 1 specifies that the joint coding of chroma residuals is enabled. When sps_joint_cbcr_enabled_flag is not present, it is inferred to be equal to 0.

At rows 102-103 of Table 3, sps_bdpcm_chroma_enabled_flag is signaled when BDPCM is enabled and ChromaArrayType has a non-zero value. When ChromaArrayType equals zero, sps_bdpcm_chroma_enabled_flag is not signaled, and can be inferred to be equal to zero. Accordingly, the BDPCM for chroma can be disabled. Semantics of sps_bdpcm_chroma_enabled_flag can be the same as in the Table 2 example.

At rows 140, 142, and 143 of Table 3, sps_act_enabled_flag is signaled when the video has a 4:4:4 chroma format and ChromaArrayType has a non-zero value. When ChromaArrayType equals zero, sps_act_enabled_flag is not signaled, and can be inferred to be equal to zero. Accordingly, the ACT can be disabled. Semantics of sps_act_enabled_flag can be the same as in the Table 2 example.

TABLE 3

| | | Descriptor |
|---|---|---|
| 1 | seq_parameter_set_rbsp( ) { | |
| 2 | sps_decoding_parameter_set_id | u(4) |
| 3 | sps_video_parameter_set_id | u(4) |
| 4 | sps_max_sub_layers_minus1 | u(3) |
| 5 | sps_reserved_zero_4bits | u(4) |
| 6 | sps_ptl_dpb_hrd_params_present_flag | u(1) |
| 7 | if( sps_ptl_dpb_hrd_params_present_flag ) | |
| 8 | profile_tier_level( 1, sps_max_sub_layers_minus1 ) | |
| 9 | gdr_enabled_flag | u(1) |
| 10 | sps_seq_parameter_set_id | u(4) |
| 11 ** | chroma_format_idc | u(2) |
| 12 ** | if( chroma_format_idc = = 3 ) | |
| 13 ** | separate_colour_plane_flag | u(1) |
| 14 | ref_pic_resampling_enabled_flag | u(1) |
| 15 | pic_width_max_in_luma_samples | ue(v) |
| 16 | pic_height_max_in_luma_samples | ue(v) |
| 17 | sps_log2_ctu_size_minus5 | u(2) |
| 18 | subpics_present_flag | u(1) |
| 19 | sps_num_subpics_minus1 | u(8) |
| 20 | for( i = 0; i <= sps_num_subpics_minus1; i++ ) { | |
| 21 | subpic_ctu_top_left_x[ i ] | u(v) |
| 22 | subpic_ctu_top_left_y[ i ] | u(v) |
| 23 | subpic_width_minus1[ i ] | u(v) |

TABLE 3-continued

| | | Descriptor |
|---|---|---|
| 24 |       subpic_height_minus1[ i ] | u(v) |
| 25 |       subpic_treated_as_pic_flag[ i ] | u(1) |
| 26 |       loop_filter_across_subpic_enabled_flag[ i ] | u(1) |
| 27 |     } | |
| 28 |   } | |
| 29 |   sps_subpic_id_present_flag | u(1) |
| 30 |   if( sps_subpics_id_present_flag ) { | |
| 31 |     sps_subpic_id_signalling_present_flag | u(1) |
| 32 |     if( sps_subpics_id_signalling_present_flag ) { | |
| 33 |       sps_subpic_id_len_minus1 | ue(v) |
| 34 |       for( i = 0; i <= sps_num_subpics_minus1; i++ ) | |
| 35 |         sps_subpic_id[ i ] | u(v) |
| 36 |     } | |
| 37 |   } | |
| 38 |   bit_depth_minus8 | ue(v) |
| 39 |   min_qp_prime_ts_minus4 | ue(v) |
| 40 |   sps_weighted_pred_flag | u(1) |
| 41 |   sps_weighted_bipred_flag | u(1) |
| 42 |   log2_max_pic_order_cnt_lsb_minus4 | u(4) |
| 43 |   sps_poc_msb_flag | u(1) |
| 44 |   if( sps_poc_msb_flag ) | |
| 45 |     poc_msb_len_minus1 | ue(v) |
| 46 |   if( sps_max_sub_layers_minus1 > 0 ) | |
| 47 |     sps_sub_layer_dpb_params_flag | u(1) |
| 48 |   if( sps_ptl_dpb_hrd_params_present_flag ) | |
| 49 |     dpb_parameters( 0, sps_max_sub_layers_minus1, sps_sub_layer_dpb_params_flag ) | |
| 50 |   long_term_ref_pics_flag | u(1) |
| 51 |   inter_layer_ref_pics_present_flag | u(1) |
| 52 |   sps_idr_rpl_present_flag | u(1) |
| 53 |   rpl1_same_as_rpl0_flag | u(1) |
| 54 |   for( i = 0; i < !rpl1_same_as_rpl0_flag ? 2 : 1; i++) { | |
| 55 |     num_ref_pic_lists_in_sps[ i ] | ue(v) |
| 56 |     for( j = 0; j < num_ref_pic_lists_in_sps[ i ]; j++) | |
| 57 |       ref_pic_list_struct( i, j ) | |
| 58 |   } | |
| 59 |   if( ChromaArrayType != 0 ) | |
| 60 |     qtbtt_dual_tree_intra_flag | u(1) |
| 61 |   log2_min_luma_coding_block_size_minus2 | ue(v) |
| 62 |   partition_constraints_override_enabled_flag | u(1) |
| 63 |   sps_log2_diff_min_qt_min_cb_intra_slice_luma | ue(v) |
| 64 |   sps_log2_diff_min_qt_min_cb_inter_slice | ue(v) |
| 65 |   sps_max_mtt_hierarchy_depth_inter_slice | ue(v) |
| 66 |   sps_max_mtt_hierarchy_depth_intra_slice_luma | ue(v) |
| 67 |   if( sps_max_mtt_hierarchy_depth_intra_slice_luma != 0 ) { | |
| 68 |     sps_log2_diff_max_bt_min_qt_intra_slice_luma | ue(v) |
| 69 |     sps_log2_diff_max_tt_min_qt_intra_slice_luma | ue(v) |
| 70 |   } | |
| 71 |   if( sps_max_mtt_hierarchy_depth_inter_slice != 0 ) { | |
| 72 |     sps_log2_diff_max_bt_min_qt_inter_slice | ue(v) |
| 73 |     sps_log2_diff_max_tt_min_qt_inter_slice | ue(v) |
| 74 |   } | |
| 75 |   if( qtbtt_dual_tree_intra_flag ) { | |
| 76 |     sps_log2_diff_min_qt_min_cb_intra_slice_chroma | ue(v) |
| 77 |     sps_max_mtt_hierarchy_depth_intra_slice_chroma | ue(v) |
| 78 |     if( sps_max_mtt_hierarchy_depth_intra_slice_chroma != 0 ) { | |
| 79 |       sps_log2_diff_max_bt_min_qt_intra_slice_chroma | ue(v) |
| 80 |       sps_log2_diff_max_tt_min_qt_intra_slice_chroma | ue(v) |
| 81 |     } | |
| 82 |   } | |
| 83 |   sps_max_luma_transform_size_64_flag | u(1) |
| 84 ** |   if( ChromaArrayType != 0 ) { | u(1) |
| 85 ** |     sps_joint_cbcr_enabled_flag | |
| 86 |     same_qp_table_for_chroma | u(1) |
| 87 |     numQpTables = same_qp_table_for_chroma ? 1 : (sps_joint_cbcr_enabled_flag ? 3 : 2) | |
| 88 |     for( i = 0; i < numQpTables; i++ ) { | |
| 89 |       qp_table_start_minus26[ i ] | se(v) |
| 90 |       num_points_in_qp_table_minus1[ i ] | ue(v) |
| 91 |       for( j = 0; j <= num_points_in_qp_table_minus1[ i ]; j++ ) { | |
| 92 |         delta_qp_in_val_minus1[ i ][ j ] | ue(v) |
| 93 |         delta_qp_diff_val[ i ][ j ] | ue(v) |
| 94 |       } | |
| 95 |     } | |
| 96 |   } | |
| 97 |   sps_sao_enabled_flag | u(1) |
| 98 |   sps_alf_enabled_flag | u(1) |
| 99 |   sps_transform_skip_enabled_flag | u(1) |

TABLE 3-continued

|   |   | Descriptor |
|---|---|---|
| 100 | if( sps_transform_skip_enabled_flag ) | |
| 101 |    sps_bdpcm_enabled_flag | u(1) |
| 102 ** | if( sps_bdpcm_enabled_flag && ChromaArrayType!=0) | |
| 103 ** |    sps_bdpcm_chroma_enabled_flag | u(1) |
| 104 | sps_ref_wraparound_enabled_flag | u(1) |
| 105 | if( sps_ref_wraparound_enabled_flag ) | |
| 106 |    sps_ref_wraparound_offset_minus1 | ue(v) |
| 107 | sps_temporal_mvp_enabled_flag | u(1) |
| 108 | if( sps_temporal_mvp_enabled_flag ) | |
| 109 |    sps_sbtmvp_enabled_flag | u(1) |
| 110 | sps_amvr_enabled_flag | u(1) |
| 111 | sps_bdof_enabled_flag | u(1) |
| 112 | if( sps_bdof_enabled_flag ) | |
| 113 |    sps_bdof_pic_present_flag | u(1) |
| 114 | sps_smvd_enabled_flag | u(1) |
| 115 | sps_dmvr_enabled_flag | u(1) |
| 116 | if( sps_dmvr_enabled_flag ) | |
| 117 |    sps_dmvr_pic_present_flag | u(1) |
| 118 | sps_mmvd_enabled_flag | u(1) |
| 119 | sps_isp_enabled_flag | u(1) |
| 120 | sps_mrl_enabled_flag | u(1) |
| 121 | sps_mip_enabled_flag | u(1) |
| 122 | if( ChromaArrayType != 0 ) | |
| 123 |    sps_cclm_enabled_flag | u(1) |
| 124 |    if( sps_cclm_enabled_flag && chroma_format_idc = = 1 ) [Ed. (JC): should sps_cclm_colocated_chroma_flag also be signalled for 422 case since it's used in the decoding process, to be confirmed] | |
| 125 |       sps_cclm_colocated_chroma_flag | u(1) |
| 126 | sps_mts_enabled_flag | u(1) |
| 127 | if( sps_mts_enabled_flag ) { | |
| 128 |    sps_explicit_mts_intra_enabled_flag | u(1) |
| 129 |    sps_explicit_mts_inter_enabled_flag | u(1) |
| 130 | } | |
| 131 | sps_sbt_enabled_flag | u(1) |
| 132 | sps_affine_enabled_flag | u(1) |
| 133 | if( sps_affine_enabled_flag ) { | |
| 134 |    sps_affine_type_flag | u(1) |
| 135 |    sps_affine_amvr_enabled_flag | u(1) |
| 136 |    sps_affine_prof_enabled_flag | u(1) |
| 137 |    if( sps_affine_prof_enabled_flag ) | |
| 138 |       sps_prof_pic_present_flag | u(1) |
| 139 | } | |
| 140 ** | if( chroma_format_idc = = 3 ) { | |
| 141 |    sps_palette_enabled_flag | u(1) |
| 142 ** |    if( Chroma Array Type != 0 ) | |
| 143 ** |       sps_act_enabled_flag | u(1) |
| 144 | } | |
| 145 | sps_bcw_enabled_flag | u(1) |
| 146 | sps_ibc_enabled_flag | u(1) |
| 147 | sps_ciip_enabled_flag | u(1) |
| 148 | if( sps_mmvd_enabled_flag ) | |
| 149 |    sps_fpel_mmvd_enabled_flag | u(1) |
| 150 | sps_triangle_enabled_flag | u(1) |
| 151 | sps_lmcs_enabled_flag | u(1) |
| 152 | sps_lfnst_enabled_flag | u(1) |
| 153 | sps_ladf_enabled_flag | u(1) |
| 154 | if( sps_ladf_enabled_flag ) { | |
| 155 |    sps_num_ladf_intervals_minus2 | u(2) |
| 156 |    sps_ladf_lowest_interval_qp_offset | se(v) |
| 157 |    for( i = 0; i < sps_num_ladf_intervals_minus2 + 1; i++ ) { | |
| 158 |       sps_ladf_qp_offset[ i ] | se(v) |
| 159 |       sps_ladf_delta_threshold_minus1[ i ] | ue(v) |
| 160 |    } | |
| 161 | } | |
| 162 | sps_scaling_list_enabled_flag | u(1) |
| 163 | sps_loop_filter_across_virtual_boundaries_disabled_present_flag | u(1) |
| 164 | if( sps_loop_filter_across_virtual_boundaries_disabled_present_flag ) { | |
| 165 |    sps_num_ver_virtual_boundaries | u(2) |
| 166 |    for( i = 0; i < sps_num_ver_virtual_boundaries; i++ ) | |
| 167 |       sps_virtual_boundaries_pos_x[ i ] | u(13) |
| 168 |    sps_num_hor_virtual_boundaries | u(2) |
| 169 |    for( i = 0; i < sps_num_hor_virtual_boundaries; i++ ) | |
| 170 |       sps_virtual_boundaries_pos_y[ i ] | u(13) |
| 171 | } | |
| 172 | if( sps_ptl_dpb_hrd_params_present_flag ) { | |
| 173 |    sps_general_hrd_params_present_flag | u(1) |
| 174 |    if( sps_general_hrd_params_present_flag ) { | |
| 175 |       general_hrd_parameters( ) | |

TABLE 3-continued

| | | Descriptor |
|---|---|---|
| 176 |       if( sps_max_sub_layers_minus1 > 0 ) | |
| 177 |         sps_sub_layer_cpb_params_present_flag | u(1) |
| 178 |         firstSubLayer = sps_sub_layer_cpb_params_present_flag ? 0 : | |
| |           sps_max_sub_layers_minus1 | |
| 179 |       ols_hrd_parameters( firstSubLayer, sps_max_sub_layers_minus1 ) | |
| 180 |     } | |
| 181 |   } | |
| 182 |   vui_parameters_present_flag | u(1) |
| 183 |   if( vui_parameters_present_flag ) | |
| 184 |     vui_parameters( ) | |
| 185 |   sps_extension_flag | u(1) |
| 186 |   if( sps_extension_flag ) | |
| 187 |     while( more_rbsp_data( ) ) | |
| 188 |       sps_extension_data_flag | u(1) |
| 189 |   rbsp_trailing_bits( ) | |
| 190 | } | |

In some embodiments, alternate implementations are employed for disabling coding tools inapplicable to a monochrome video or a video including separately encoded components.

In an embodiment, the following syntax of sps_act_enabled_flag in Table 4 (which is copied from Table 3) can be expressed with alternate syntax shown in Table 5 to set the value of sps_act_enabled_flag to 0 when chroma_format_idc equals 3 and ChromaArrayType is zero. Since chroma_format_idc==3 and separate_colour_plan_flag==0 implies ChromaArrayType not 0, the syntax in Table 4 and Table 5 can have the same effect. It is noted that the signaling of sps_act_enabled_flag is independent from the signaling of sps_palette_enabled_flag at row 141.

TABLE 4

| 140 ** | if( chroma_format_idc == 3 ) { | |
| --- | --- | --- |
| 141 |   sps_palette_enabled_flag | u(1) |
| 142 ** |   if( ChromaArrayType != 0 ) | |
| 143 ** |     sps_act_enabled_flag | u(1) |
| 144 | } | |

TABLE 5

| 140 ** | if( chroma_format_idc == 3 ) { | |
| --- | --- | --- |
| 141 |   sps_palette_enabled_flag | u(1) |
| 142 ** |   if(separate_colour_plane_flag== 0) | |
| 143 ** |     sps_act_enabled_flag | u(1) |
| 144 | } | |

In an embodiment, the following syntax of sps_bdpcm_chroma_enabled_flag in Table 6 (which is copied from Table 3) can be expressed with alternate syntax as shown in Table 7 to set the value of sps_bdpcm_chroma_enabled_flag to 0 when ChromaArrayType is zero. In Table 7, the value of sps_bdpcm_chroma_enabled_flag is inferred to be 0 when ChromaArrayType is zero or a sps_transpquant_bypass_flag to support BDPCM for lossless equals 0. When sps_tranquant_bypass_flag equals 1, sps_transquant_bypass flag indicates that transformation and quantization pass shall be activated at the CU level. Otherwise, if sps_tranquant_bypass_flag equals 0, transformation and quantization bypass shall not be activated. The sps_tranquant_bypass_flag can be signaled at the SPS or be inferred to be 1 for lossless coding as indicated by other SPS level lossless coding indication flag.

TABLE 6

| 102 ** | if( sps_bdpcm_enabled_flag && ChromaArrayType!=0) | |
| --- | --- | --- |
| 103 ** |   sps_bdpcm_chroma_enabled_flag | u(1) |

TABLE 7

| 102 ** | if( sps_bdpcm_enabled_flag && cu_transquant_bypass_flag && ChromaArrayType!=0) | |
| --- | --- | --- |
| 103 ** |   sps_bdpcm_chroma_enabled_flag | u(1) |

In an embodiment, the syntax in Table 7 is used. However, different from the above embodiment, the semantics of the syntax element sps_tranquant_bypass_flag is defined as follows. When sps_tranquant_bypass_flag equals 1, sps_transquant_bypass flag indicates that transformation and quantization pass may (instead of shall) be activated at the CU level. Otherwise, if sps_tranquant_bypass_flag equals 0, transformation and quantization bypass shall not be activated. The sps_tranquant_bypass_flag can be signaled at the SPS or be inferred to be 1 for lossless coding as indicated by other SPS level lossless coding indication flag.

Figure 8:
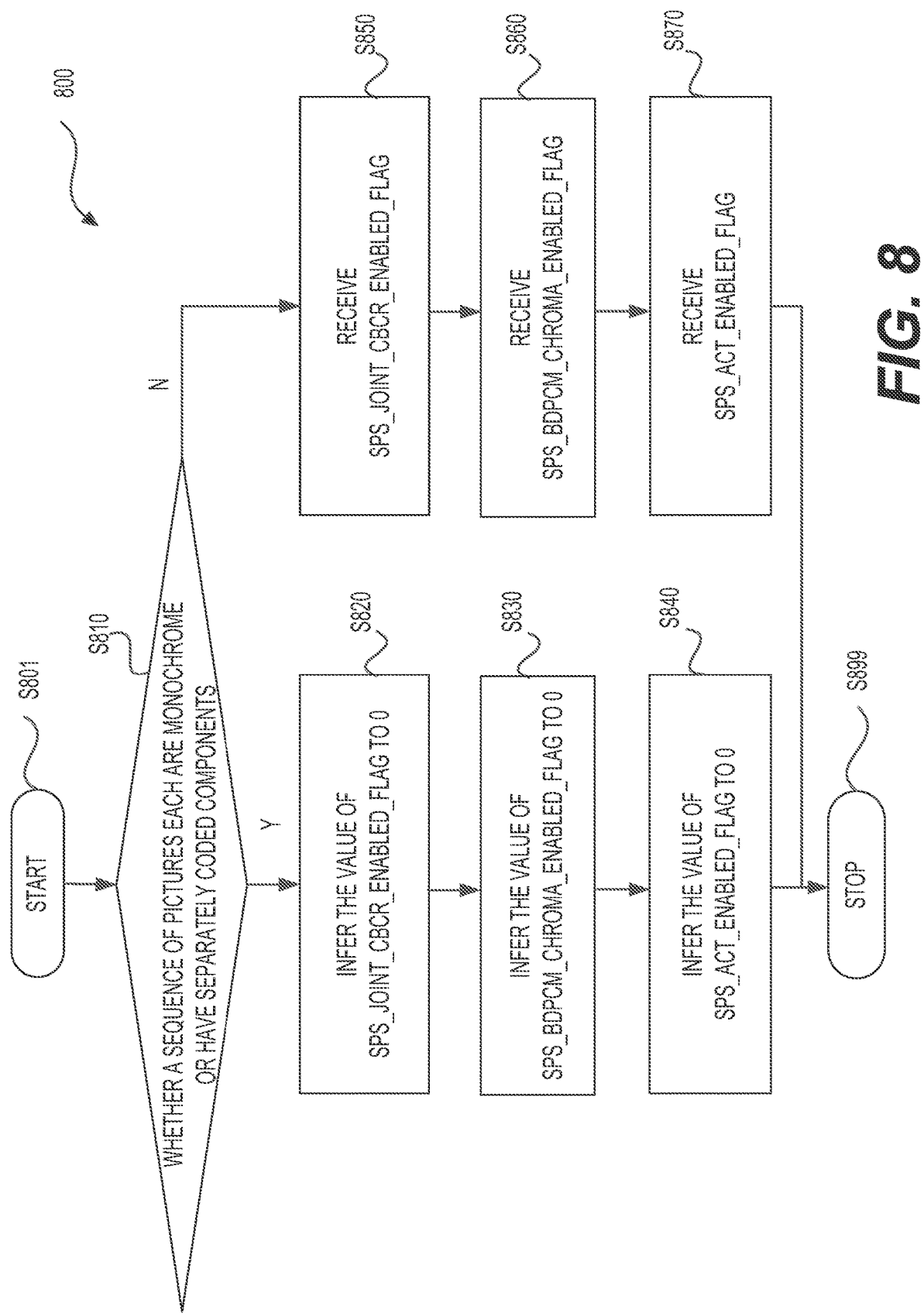
FIG. 8 is an illustration of an embodiment of a process performed by a decoder.

FIG. 8 shows an example process (800) of receiving flags of cross component coding tools or chroma component based coding tools in a bitstream of a coded video. The process (800) can be performed at a decoder. The process (800) can start from (S801) and proceed to (S810).

At S(810), a syntax element can be received in the bitstream that indicate whether pictures of a sequence each are monochrome or have separately encoded components. For example, the syntax element can be the chroma_format_idc, or the separate_color_plane_flag. The chroma_format_idc being 0 can indicate the pictures are monochrome. The separate_color_plane_flag being 1 can indicate the pictures each having separately coded components. In both the cases, the ChromaArrayType can have a value of 0.

As an example, the sequence of pictures refer the SPS in Table 3. The chroma_format_idc signaled in row 11 in Table 3 is received. When the chroma_format_idc has a value of 0, it can be determined the pictures are monochrome. When the chroma_format_idc equals zero, the separate_color_plane_flag may not be signaled at row 13, and can be inferred to be equal to zero in one example. Accordingly, the ChromaArrayType can be set equal to chroma_format_idc that is zero for the current case.

When the chroma_format_idc has a value of 3 indicating a 4:4:4 chroma format of the pictures of the sequence, the separate_colour_plane_flag can be received at row 13. If the separate_colour_plane_flag has a value of 1, which indicates the pictures are required to separately coding the components, it can be determined the pictures have separately encoded components. The ChromaArrayType can be set equal to zero.

In other cases, when the chroma_format_idc received in row 11 has a value of 1 or 2, or when the chroma_format_idc received in row 11 has a value of 3 but the separate_colour_plane_flag has a value of 0, it can be determined the pictures each are not monochrome and include components that are not coded separately. Joint components coding tools or chroma based coding tools can be applied to the pictures. For the chroma_format_idc received in row 11 of Table 3 having a value of 1 or 2 (the pictures are not monochrome), the separate_colour_plane_flag can be inferred as zero. Accordingly, the ChromeArrayType can take the value of chroma_format_idc that is 1 or 2 (not zero). For the scenario that the chroma_format_idc received has a value of 3 but the separate_colour_plane_flag has a value of 0, the ChromeArrayType can still take the value of chroma_format_idc that is 3 (not zero).

When the pictures are determined to be monochrome or include separately encoded components, or the ChromaArrayType is determined to be equal to zero, the steps of (S820) to (S840) can be performed. The syntax elements for control of the joint-components coding tools or chroma-based coding tool can be inferred to be equal to zero to disable those coding tools. Specifically, sps_joint_cbcr_enabled_flag, sps_bdpcm_chroma_enabled_flag, and sps_act_enabled_flag are each inferred to be equal to zero.

When the pictures are determined to not be monochrome and include components that are not separately encoded, or the chromeArrayType is determined to be not equal zero, the steps of (S850) to (S870) can be performed. The syntax elements for control of the joint-components coding tools or chroma-based coding tool can be received from the bitstream. Specifically, sps_joint_cbcr_enabled_flag, sps_bdpcm_chroma_enabled_flag, and sps_act_enabled_flag can be received successively.

After either (S840) or (S870), the process (800) can proceed to (S899) and terminate at (S899).

Figure 9:
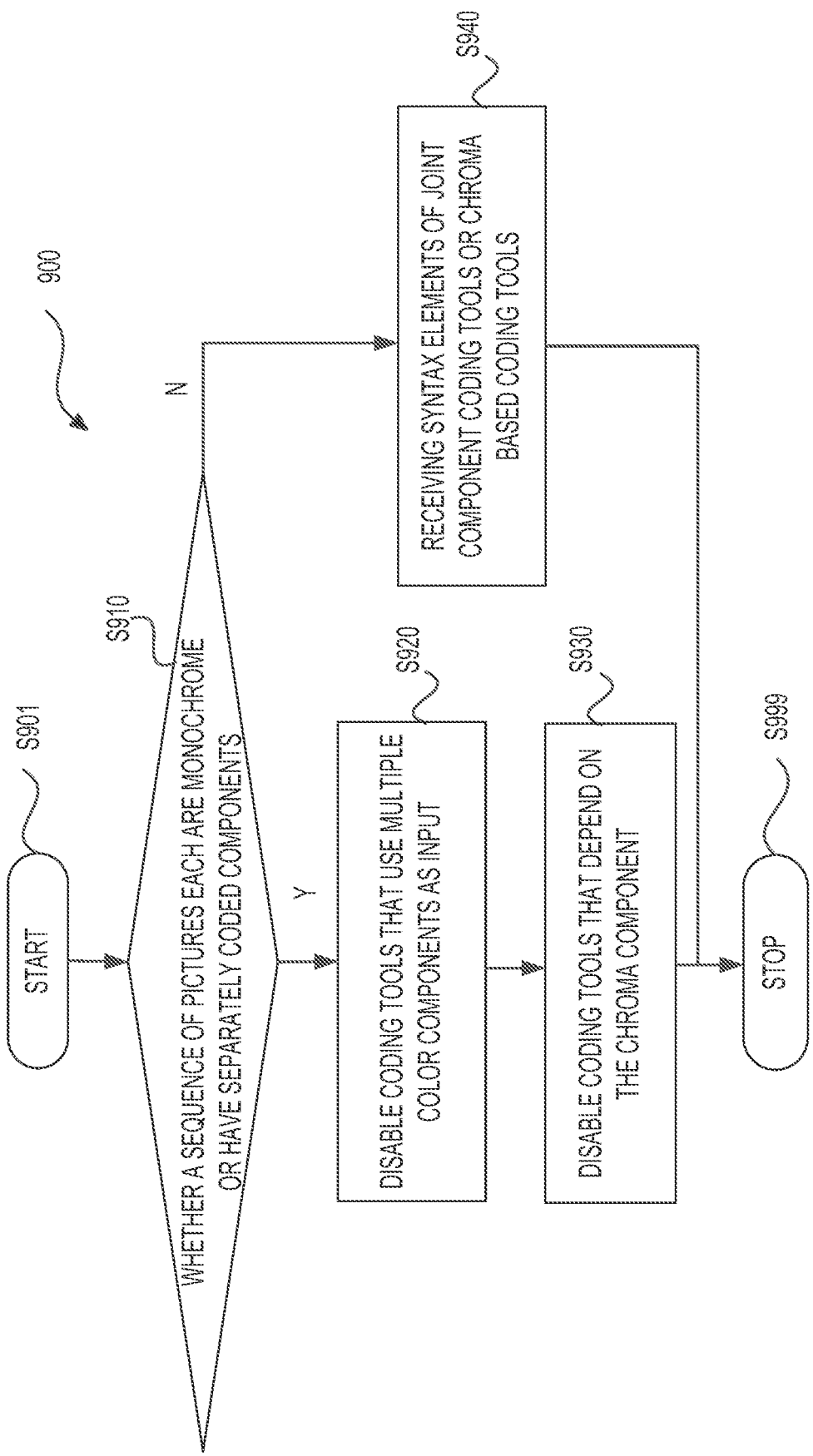
FIG. 9 is an illustration of an embodiment of another process performed by a decoder.

FIG. 9 shows a process (900) of disabling coding tools inapplicable to a monochrome video or a video including separately encoded components according to an embodiment of the disclosure. The process (900) can be performed at a decoder such as decoder (710). The process (900) can start from (S901) and proceed to (S910).

At (S910), a syntax element can be received in a bitstream that indicate whether a sequence of pictures each are monochrome or have separately encoded components. For example, the syntax element can be the chroma_format_idc, or the separate_color_plane_flag in the Table 3 example. The chroma_format_idc being 0 can indicate the pictures are monochrome. The separate_color_plane_flag being 1 can indicate the pictures each having separately coded components. In both the cases (chroma_format_idc being 0 or separate_color_plane_flag being 1), the variable ChromaArrayType can have a value of 0.

When it is determined the sequence of pictures each are monochrome or have separately encoded components, the steps (S920) and (S930) can be performed. At (S920), coding tools that use multiple components of the pictures as input can be disabled, for example, by inferring a value of a syntax element controlling each corresponding coding tool. Examples of such coding tools can include ACT, joint coding of chroma residuals, or the like.

At (S930), coding tools that depend on a chroma component of the pictures can be disabled, for example, by inferring a value of a syntax element controlling each corresponding coding tool. Examples of such coding tools can include BDPCM for chroma. The process (900) can then proceed to (S999) and terminate at (S999).

When it is determined at (S910) that the sequence of pictures each are not monochrome or do not have separately encoded components, the step (S940) can be performed. At (S940), syntax elements for enabling the joint component coding tools or chroma component based coding tools can be received from the bit stream. Whether the syntax elements for enabling those coding tools are signaled in the bitstream may depending on other conditions or other syntax elements transmitted in the bitstream. The process (900) can then proceed to (S999) and terminate at (S999).

IV. Computer System

The techniques described above, can be implemented as computer software using computer-readable instructions and physically stored in one or more computer-readable media. For example, FIG. 10 shows a computer system (1000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
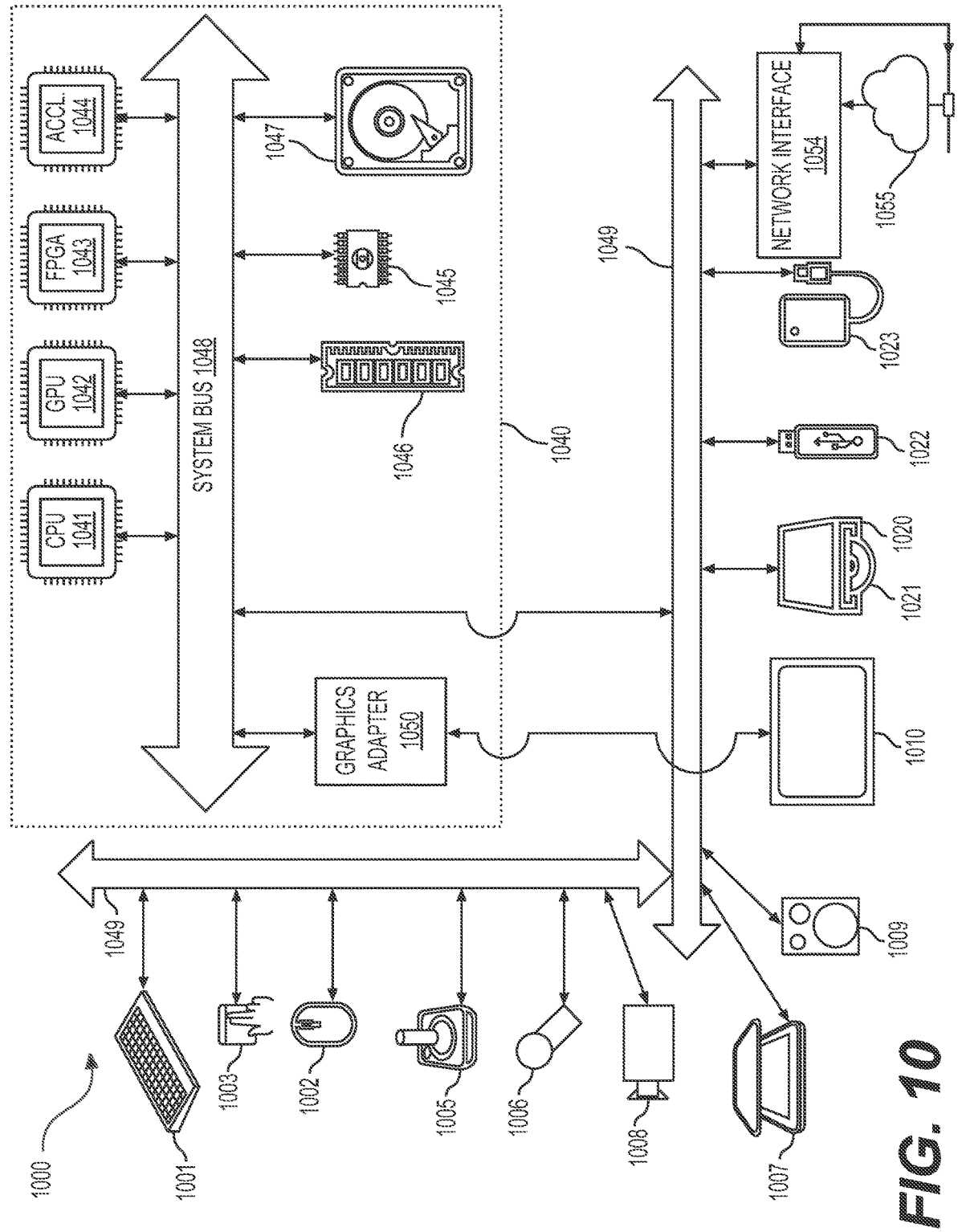
FIG. 10 is a schematic illustration of a computer system in accordance with an embodiment of the present disclosure.

The components shown in FIG. 10 for computer system (1000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1000).

Computer system (1000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1001), mouse (1002), trackpad (1003), touch screen (1010), data-glove (not shown), joystick (1005), microphone (1006), scanner (1007), camera (1008).

Computer system (1000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1010), data-glove (not shown), or joystick (1005), but there can also be tactile feedback devices that do not serve as input devices), audio output devices (such as: speakers (1009), headphones (not depicted)), visual output devices (such as screens (1010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1000) can also include human accessible storage devices and their associated media such as optical media including CD/DVD ROM/RW (1020) with CD/DVD or the like media (1021), thumb-drive (1022), removable hard drive or solid state drive (1023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1000) can also include an interface (1054) to one or more communication networks (1055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1049) (such as, for example USB ports of the computer system (1000)); others are commonly integrated into the core of the computer system (1000) by attachment to a system bus as described below (for example Ethernet interface into a PC computer system or cellular network interface into a smartphone computer system). Using any of these networks, computer system (1000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1040) of the computer system (1000).

The core (1040) can include one or more Central Processing Units (CPU) (1041), Graphics Processing Units (GPU) (1042), specialized programmable processing units in the form of Field Programmable Gate Areas (FPGA) (1043), hardware accelerators for certain tasks (1044), graphics adapters (1050), and so forth. These devices, along with Read-only memory (ROM) (1045), Random-access memory (1046), internal mass storage such as internal non-user accessible hard drives, SSDs, and the like (1047), may be connected through a system bus (1048). In some computer systems, the system bus (1048) can be accessible in the form of one or more physical plugs to enable extensions by additional CPUs, GPU, and the like. The peripheral devices can be attached either directly to the core's system bus (1048), or through a peripheral bus (1049). In an example, the screen (~~x10) can be connected to the graphics adapter (~~x50). Architectures for a peripheral bus include PCI, USB, and the like.

CPUs (1041), GPUs (1042), FPGAs (1043), and accelerators (1044) can execute certain instructions that, in combination, can make up the aforementioned computer code. That computer code can be stored in ROM (1045) or RAM (1046). Transitional data can also be stored in RAM (1046), whereas permanent data can be stored for example, in the internal mass storage (1047). Fast storage and retrieve to any of the memory devices can be enabled through the use of cache memory, that can be closely associated with one or more CPU (1041), GPU (1042), mass storage (1047), ROM (1045), RAM (1046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1000), and specifically the core (1040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1040) that are of non-transitory nature, such as core-internal mass storage (1047) or ROM (1045). The software implementing various embodiments of the present disclosure can be stored in such devices and executed by core (1040). A computer-readable medium can include one or more memory devices or chips, according to particular needs. The software can cause the core (1040) and specifically the processors therein (including CPU, GPU, FPGA, and the like) to execute particular processes or particular parts of particular processes described herein, including defining data structures stored in RAM (1046) and modifying such data structures according to the processes defined by the software. In addition or as an alternative, the computer system can provide functionality as a result of logic hardwired or otherwise embodied in a circuit (for example: accelerator (1044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

VTM: Versatile Video Coding Test Model
SPS: sequence parameter set
BDPCM: Block-based Delta Pulse Code Modulation
ACT: Adaptive Colour Transform
JEM: joint exploration model
VVC: versatile video coding
BMS: benchmark set
MV: Motion Vector HEVC: High Efficiency Video Coding
SEI: Supplementary Enhancement Information
VUL Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video encoding performed in a video encoder, comprising:
   determining whether a sequence of pictures is monochrome or includes three color components that are coded separately;
   setting a value of a first syntax element indicating whether the sequence of pictures is monochrome or includes the three color components that are coded separately; and
   encoding the value of the first syntax element in a bitstream of a coded video, wherein
   a value of a second syntax element is inferred to indicate that active color transform (ACT) is disabled based on the first syntax element indicating that the sequence of pictures is monochrome.

2. The method of claim 1, wherein the value of the second syntax element is in a sequence parameter set (SPS).

3. The method of claim 1, wherein a value of a variable is determined to be zero based on the first syntax element indicating that the sequence of pictures is monochrome, the variable indicating a chroma array type of the sequence of pictures; and
   the value of the second syntax element is inferred to be equal to zero when the value of the variable is determined to be zero.

4. The method of claim 1, further comprising:
   encoding the value of the second syntax element indicating whether the ACT is enabled in the bitstream of the coded video based on the sequence of pictures being determined to include the three color components that are coded separately.

5. The method of claim 1, further comprising:
   setting a value of a variable indicating a chroma array type of the sequence of pictures based on the sequence of pictures being determined as not monochrome; and
   encoding the second syntax element indicating whether the ACT is enabled in the bitstream of the coded video based on the value of the variable being non-zero.

6. The method of claim 2, wherein the second syntax element is chroma_format_idc.

7. The method of claim 6, wherein the value of the second syntax element indicates that the sequence of pictures has separately encoded color components.

8. A method of video decoding in a video decoder, the method comprising:
   receiving a bitstream of a coded video that includes a first syntax element indicating whether a sequence of pictures is monochrome or includes three color components that are encoded separately;
   decoding a value of the first syntax element in the bitstream of the coded video; and
   inferring a value of a second syntax element to indicate that active color transform (ACT) is disabled when the decoded value of the first syntax element indicates that the sequence of pictures is monochrome.

9. The method of claim 8, wherein the value of the second syntax element is in a sequence parameter set (SPS).

10. The method of claim 8, further comprising:
    determining a value of a variable to be zero based on the first syntax element indicating that the sequence of pictures is monochrome, the variable indicating a chroma array type of the sequence of pictures, wherein
    the inferring includes inferring that the value of the second syntax element is equal to zero when the value of the variable is determined to be zero.

11. The method of claim 8, further comprising:
    decoding the value of the second syntax element indicating whether the ACT is enabled in the bitstream of the coded video based on the sequence of pictures being determined to include the three color components that are coded separately.

12. The method of claim 8, further comprising:
    determining a value of a variable indicating a chroma array type of the sequence of pictures based on the sequence of pictures being determined as not monochrome; and
    decoding the second syntax element indicating whether the ACT is enabled from the bitstream of the coded video based on the value of the variable being non-zero.

13. The method of claim 9, wherein the second syntax element is chroma_format_idc.

14. The method of claim 13, wherein the value of the second syntax element indicates that the sequence of pictures has separately encoded color components.

15. A method of processing visual media data, the method comprising:
    performing a conversion between a visual media file and a bitstream of visual media data according to a format rule, wherein the bitstream includes a first syntax element indicating whether a sequence of pictures is monochrome or includes three color components that are encoded separately;

the format rule specifies that the bitstream includes a second syntax element when the first syntax element indicates that the sequence of pictures is not monochrome, a value of the second syntax element indicating whether active color transform (ACT) is enabled; and the format rule specifies that the value of the second syntax element is inferred to indicate that the ACT is disabled when the first syntax element indicates that the sequence of pictures is monochrome.

16. The method of claim 15, wherein the value of the second syntax element is in a sequence parameter set (SPS).

17. The method of claim 15, wherein the format rule specifies that:

a value of a variable is zero based on the first syntax element indicating that the sequence of pictures is monochrome, the variable indicating a chroma array type of the sequence of pictures; and the value of the second syntax element is inferred to be equal to zero when the value of the variable is zero.

18. The method of claim 15, wherein the format rule specifies that:

the value of the second syntax element indicating whether the ACT is enabled is included in the bitstream based on the sequence of pictures including the three color components that are coded separately.

19. The method of claim 15, wherein the format rule specifies that:

a value of a variable indicating a chroma array type of the sequence of pictures is set based on the sequence of pictures not being monochrome; and the second syntax element indicating whether the ACT is enabled is included in the bitstream based on the value of the variable being non-zero.

20. The method of claim 16, wherein the second syntax element is chroma_format_idc.

* * * * *